(12) United States Patent
Cui et al.

(10) Patent No.: US 12,418,938 B2
(45) Date of Patent: Sep. 16, 2025

(54) ELECTRONIC DEVICE, WIRELESS COMMUNICATION METHOD, AND NON-TRANSITORY COMPUTER-READABLE STORAGE MEDIUM

(71) Applicant: Sony Group Corporation, Tokyo (JP)

(72) Inventors: Qimei Cui, Beijing (CN); Hao Li, Beijing (CN); Tao Cui, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 400 days.

(21) Appl. No.: 18/001,724

(22) PCT Filed: Jun. 21, 2021

(86) PCT No.: PCT/CN2021/101197
§ 371 (c)(1),
(2) Date: Dec. 14, 2022

(87) PCT Pub. No.: WO2022/001720
PCT Pub. Date: Jan. 6, 2022

(65) Prior Publication Data
US 2023/0345533 A1    Oct. 26, 2023

(30) Foreign Application Priority Data
Jun. 28, 2020 (CN) .......................... 202010596873.9

(51) Int. Cl.
*H04W 74/0816* (2024.01)
*H04L 5/00* (2006.01)

(52) U.S. Cl.
CPC ....... *H04W 74/0816* (2013.01); *H04L 5/0053* (2013.01)

(58) Field of Classification Search
CPC .......................... H04L 5/0053; H04W 74/0816
See application file for complete search history.

(56) References Cited

U.S. PATENT DOCUMENTS 11,317,295 B2    4/2022    Yang
2012/0327922 A1  12/2012   Takahashi
(Continued)

FOREIGN PATENT DOCUMENTS

CN    110366248 A    10/2019
CN    110536453 A    12/2019
(Continued)

OTHER PUBLICATIONS

International Search Report and Written Opinion mailed on Sep. 18, 2021, received for PCT Application PCT/CN2021/101197, filed on Jun. 21, 2021, 11 pages including English Translation.
(Continued)

*Primary Examiner* — Kevin M Cunningham
(74) *Attorney, Agent, or Firm* — XSENSUS LLP

(57) ABSTRACT

Provided are an electronic device, a wireless communication method and a non-transitory computer-readable storage medium. The electronic device comprises a processing circuit, and the processing circuit is configured: to perform a first uplink data transmission to a first transmission point within a channel occupation time after the electronic device successfully accesses an unlicensed frequency band; and to perform a second uplink data transmission to a second transmission point on the basis of an acknowledgement message from the second transmission point in the vicinity of the first transmission point within the remaining time after the first uplink data transmission is completed in the channel occupation time, wherein the acknowledgement message is transmitted to the electronic device by the second transmission point in response to an additional transmission request transmitted to the second transmission point by the first transmission point after completion of the first uplink data transmission.

11 Claims, 15 Drawing Sheets

(56) References Cited

U.S. PATENT DOCUMENTS

| | | | |
|---|---|---|---|
| 2019/0342045 A1 | 11/2019 | Radulescu et al. | |
| 2020/0053798 A1* | 2/2020 | Tsai | H04W 72/23 |
| 2020/0145972 A1 | 5/2020 | Kwak et al. | |
| 2022/0210823 A1* | 6/2022 | Alfarhan | H04L 1/1887 |
| 2022/0210827 A1* | 6/2022 | Wang | H04W 16/14 |

FOREIGN PATENT DOCUMENTS

| | | |
|---|---|---|
| WO | WO-2019056370 A1 | 3/2019 |
| WO | 2020/033549 A1 | 2/2020 |
| WO | 2020/033623 A1 | 2/2020 |
| WO | 2020/063577 A1 | 4/2020 |

OTHER PUBLICATIONS

Huawei et al., "Coexistence and channel access for NR unlicensed band operations", 3GPP TSG RAN WG1 Meeting #96bis, R1-1903928, Apr. 8-12, 2019, 20 pages.

Ericsson: "on AUL Channel Access", 3GPP Draft; RI-1720374, 3rd Generation Partnership Project (3GPP), Mobile Competence Centre; 650, Route Des Lucioles; F-06921 Sophia-Antipolis Cedex; France vol. RAN WGI, No. Reno, USA; Nov. 27, 2017-Dec. 1, 2017 Nov. 17, 2017 (Nov. 17, 2017), XP051368981.

* cited by examiner

ELECTRONIC DEVICE, WIRELESS COMMUNICATION METHOD, AND NON-TRANSITORY COMPUTER-READABLE STORAGE MEDIUM

CROSS-REFERENCE TO RELATED APPLICATIONS

This application is based on PCT filing PCT/CN2021/101197, filed Jun. 21, 2021, which claims the priority of the Chinese patent application filed on Jun. 28, 2020 with the application No. 202010596873.9 and the invention title "Electronic Device, Wireless Communication Method and Non-transitory Computer-readable Storage Medium", all of which are incorporated herein by reference.

FIELD

The present application relates to the technical field of wireless communication, and more particularly, to an electronic device, a wireless communication method in the electronic device, and a non-transitory computer-readable storage medium for realizing transmission in an unlicensed frequency band.

BACKGROUND

In order to access the unlicensed frequency band, a user equipment (UE) needs to perform channel detection such as listen before talk (LBT) to determine whether the unlicensed channel is idle. When the result of the channel detection indicates that the unlicensed channel is idle (also referred to as "channel detection succeeds" or "LBT succeeds" when appropriate), the UE can successfully access the unlicensed frequency band, thereby obtaining the Channel Occupancy Time (COT) to continuously occupy the channel and perform transmission within the COT. When the result of channel detection indicates that the unlicensed channel is occupied, the UE needs to back off randomly and perform channel detection again.

Similarly, in order to access the unlicensed band, one or more Transmission and Reception Points (TRPs) serving the UE also need to perform channel detection to determine whether the unlicensed channel is free, and only when the unlicensed channel is free the TRP(s) may successfully access the unlicensed band to obtain COT and perform transmission.

In the above mechanism, the UE and the TRP(s) obtain and use their own COTs, respectively, without taking into account the sharing of the COTs between the UE and the TRP(s), resulting in failure to make full use of the obtained COT resources.

SUMMARY

The following presents a brief summary of the disclosure in order to provide a basic understanding of certain aspects of the disclosure. It should be understood, however, that this summary is not an exhaustive overview of the present disclosure. It is not intended to identify key or critical parts of the disclosure nor to limit the scope of the disclosure. Its sole purpose is to present some concepts related to the disclosure in a simplified form as a prelude to the more detailed description that is presented later.

In view of the above problems, an object of at least one aspect of the present disclosure is to provide an electronic device, a wireless communication method in the electronic device, and a non-transitory computer-readable storage medium, which enable the COT obtained by the user equipment to be shared between the user equipment and the transmission reception points, thus improving the resource utilization of unlicensed frequency bands.

According to an aspect of the present disclosure, there is provided an electronic device, which includes a processing circuitry configured to: perform, in a channel occupancy time obtained by the electronic device successfully accessing an unlicensed frequency band, first uplink data transmission to a first transmission reception point; and perform, in a remaining period after the first uplink data transmission is completed in the channel occupancy time, second uplink data transmission to a second transmission reception point in the vicinity of the first transmission reception point based on an acknowledgment message from the second transmission reception point, wherein the acknowledgement message is sent by the second transmission reception point to the electronic device in response to an additional transmission request which is sent by the first transmission reception point to the second transmission reception point after the first uplink data transmission is completed.

According to another aspect of the present disclosure, there is also provided an electronic device, which includes a processing circuitry configured to: receive, in a channel occupancy time obtained by a user equipment successfully accessing an unlicensed frequency band, first uplink data transmission from the user equipment; and sending, in a remaining period after the first uplink data transmission is completed in the channel occupancy time, an additional transfer request related to second uplink data transmission of the user equipment to another electronic device in the vicinity of the electronic device.

According to yet another aspect of the present disclosure, there is also provided an electronic device, which includes a processing circuitry configured to: receive, in a remaining period of a channel occupancy time obtained by a user equipment successfully accessing an unlicensed frequency band, an additional transmission request related to a user equipment of an electronic device from another electronic, wherein the additional transmission request is sent by said another electronic device after the first uplink data transmission from the user equipment is completed in the channel occupancy time; send an acknowledgement message to the user equipment in response to the additional transmission request; and receive, in the remaining period, the second uplink data transmission performed by the user equipment based on the acknowledgement message.

According to yet another aspect of the present disclosure, there is also provided an electronic device, which includes a processing circuitry configured to: receive transmission requests from a first transmission reception point and a second transmission reception point; simultaneously send acknowledgment messages to the first transmission reception point and the second transmission reception point in a channel occupancy time obtained by successfully accessing an unlicensed frequency band in response to the transmission request; and simultaneously receive, in the channel occupancy time, downlink data from the first transmission reception point and the second transmission reception point.

According to yet another aspect of the present disclosure, there is also provided an electronic device, which includes a processing circuitry configured to: send a transmission request to a user equipment; receive an acknowledgement message from the user equipment in a channel occupancy time which is obtained by the user equipment successfully accessing an unlicensed frequency band in response to the transmission request; and send, in response to the acknowledgement message, downlink data to the user equipment in the channel occupancy time, wherein the respective processing circuitries of the electronic device and another electronic device are configured to simultaneously perform processing of sending a transmission request, receiving an acknowledgment message, and sending downlink data.

According to yet another aspect of the present disclosure, there is also provided a wireless method in an electronic device, the method comprising: performing first uplink data transmission to a first transmission reception point in a channel occupancy time obtained by the electronic device successfully accesses an unlicensed frequency band; and performing, in a remaining period after the first uplink data transmission is completed in the channel occupancy time, second uplink data transmission to a second transmission reception point in the vicinity of the first transmission reception point based on an acknowledgement message from the second transmission reception point, wherein the acknowledgement message is sent by the second transmission reception point to the electronic device in response to an additional transmission request, the additional transmission request being sent by the first transmission reception point to the second transmission reception point when the first uplink data transmission is completed.

According to still another aspect of the present disclosure, there is also provided a wireless method in an electronic device, the method comprising: receiving first uplink data transmission from a user equipment in a channel occupancy time obtained by the user equipment successfully accessing an unlicensed frequency band; and sending, in a remaining period after the first uplink data transmission is completed in the channel occupancy time, an additional transmission request related to second uplink data transmission of the user equipment to another electronic device in the vicinity of the electronic device.

According to yet another aspect of the present disclosure, there is also provided a wireless method in an electronic device, the method comprising: receiving, in a remaining period of a channel occupancy time obtained by a user equipment successfully accessing an unlicensed frequency band, an additional transmission request related to the user equipment from another electronic device, wherein the additional transmission request is sent by said another electronic device when the first uplink data transmission from the user equipment is completed in the channel occupancy time; sending an acknowledgement message to the user equipment in response to the additional transmission request; and receiving, in the remaining period, the second uplink data transmission performed by the user equipment based on the acknowledgment message.

According to yet another aspect of the present disclosure, there is also provided a wireless method in an electronic device, the method comprising: receiving transmission requests from a first transmission reception point and a second transmission reception point; simultaneously sending acknowledgment messages to the first transmission reception point and the second transmission reception point in a channel occupancy time obtained by successfully accessing an unlicensed frequency band in response to the transmission request; and simultaneously receiving, in the channel occupancy time, downlink data from the first transmission reception point and the second transmission reception point.

According to yet another aspect of the present disclosure, there is also provided a wireless method in an electronic device, the method comprising: sending a transmission request to a user equipment; receiving an acknowledgement message from the user equipment in a channel occupancy time which is obtained by the user equipment successfully accessing an unlicensed frequency band in response to the transmission request; and sending, in response to the acknowledgement message, downlink data to the user equipment in the channel occupancy time, wherein the electronic device and another electronic device simultaneously perform processing of sending a transmission request, receiving an acknowledgment message, and sending downlink data.

According to another aspect of the present disclosure, there is also provided a non-transitory computer-readable storage medium storing executable instructions, and the executable instructions, when executed by a processor, cause the processor to execute the various functions of the electronic device or the wireless communication method in the electronic device described above.

According to other aspects of the present disclosure, there are also provided computer program codes and computer program products for implementing the above-described methods according to the present disclosure.

According to at least one aspect of the embodiments of the present disclosure, the COT obtained by the user equipment can be shared among multiple transmission reception points, thereby improving the resource utilization of the unlicensed frequency band.

Other aspects of embodiments of the present disclosure are set forth in the following section of description, wherein the detailed description is provided to fully disclose the preferred embodiments of the embodiments of the present disclosure without imposing limitations thereon.

BRIEF DESCRIPTION OF THE DRAWINGS

The drawings described herein are for illustrating selected embodiments only rather than all possible implementations, and are not intended to limit the scope of the present disclosure. In the drawings.

Figure 1:
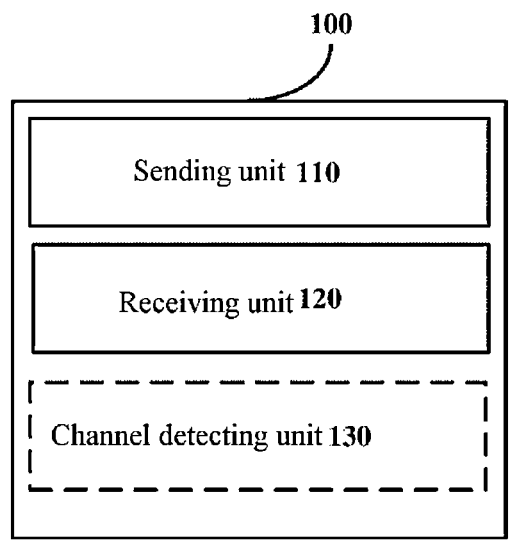
FIG. 1 is a block diagram showing a configuration example of an electronic device on the user equipment side according to a first embodiment of the present disclosure.

Although the present disclosure is susceptible to various modifications and alternative forms, specific embodiments thereof have been shown by way of examples in the drawings and are described in detail herein. It should be understood, however, that the description of specific embodiments herein is not intended to limit the present disclosure to the precise forms disclosed. Instead, the purpose of the present disclosure is to cover all modifications, equivalents and substitutions falling within the spirit and scope of the present disclosure. It should be noted that throughout the drawings, corresponding reference numerals indicate corresponding parts.

DETAILED DESCRIPTION

Examples of the present disclosure will now be described more fully with reference to the accompanying drawings. The following description is merely exemplary in nature and is not intended to limit the disclosure, application, or uses.

Example embodiments are provided so that the present disclosure becomes thorough, and the scope can be fully conveyed to those skilled in the art. Numerous specific details such as examples of specific components, devices, and methods are set forth in order to provide a thorough understanding of embodiments of the present disclosure. It is apparent to those skilled in the art that example embodiments may be embodied in many different forms without the specific details, and that neither should be construed to limit the scope of the present disclosure. In some example embodiments, well-known processes, well-known structures and well-known technologies are not described in detail.

Description is made in the following order:
1. Description of the problem
2. Configuration examples of the first embodiment (uplink scenario)
    2.1 Configuration example of electronic device on the user equipment side
    2.2 Configuration example of electronic device on the first transmission reception point side
    2.3 Configuration example of electronic device on the second transmission reception point side
    2.4 Example of sharing COT, FIG. 5
3. Configuration examples of the second embodiment (downlink scenario)
    3.1 Configuration example of electronic device on the user equipment side
    3.2 Configuration example of electronic device on the transmission reception point side
    3.3 Example of sharing COT
4. Method embodiments
    4.1 Method embodiments of the first embodiment (uplink scenario)
    4.2 Method embodiments of the second embodiment (downlink scenario)
5. Application examples

1. DESCRIPTION OF THE PROBLEM

In the prior art, in order to access the unlicensed frequency band, the UE and one or more TRPs serving the UE obtain and use their respective COTs, without considering the COT to be shared between the UE and the TRPs. As a result, the COT resources obtained cannot be fully utilized.

To this end, the present disclosure provides an electronic device, a wireless communication method in the electronic device, and a non-transitory computer-readable storage medium, which enable the COT obtained by the user equipment to be shared between the user equipment and a plurality of transmission reception points, thereby improving the resource utilization of unlicensed frequency bands.

The electronic device on the user equipment side according to the present disclosure may be implemented as various user equipment such as mobile terminals such as smartphones, tablet personal computers (PCs), notebook PCs, portable game terminals, portable/dongle type mobile routers and digital cameras) or in-vehicle terminals (such as a car navigation device). The user equipment may also be implemented as a terminal (also referred to as a machine-type communication (MTC) terminal) that performs machine-to-machine (M2M) communication. Furthermore, the user equipment may be a wireless communication module (such as an integrated circuit module comprising a single die) mounted on each of the above-mentioned terminals.

The electronic device on the transmission reception point side according to the present disclosure may be implemented as various types of TRPs. The TRP may have functions of transmitting and receiving, for example, the TRP may receive information from the user equipment and the base station device, and may also transmit information to the user equipment and the base station device. In a typical example, the TRP may serve the user equipment and be controlled by the base station device. Further, the TRP may have a structure similar to that of the base station device, or may only have the structure related to transmitting and receiving information in the base station device.

Configuration examples of various electronic devices and various method embodiments according to the first embodiment of the uplink scenario and the second embodiment of the downlink scenario will be described below.

2. CONFIGURATION EXAMPLES OF THE FIRST EMBODIMENT (UPLINK SCENARIO)

[2.1 Configuration Example of Electronic Device on the User Equipment Side]

FIG. 1 is a block diagram showing a configuration example of an electronic device on the user equipment side according to the first embodiment of the present disclosure.

As shown in FIG. 1, the electronic device 100 may include a sending unit 110, a receiving unit 120 and an optional channel detecting unit 130.

Here, each unit of the electronic device 100 may be included in the processing circuitry. It should be noted that the electronic device 100 may include either one processing circuitry or multiple processing circuitries. Further, the processing circuitry may include various discrete functional units to perform various different functions and/or operations. It should be noted that these functional units may be physical entities or logical entities, and units with different names may be implemented by the same physical entity.

In addition, the electronic device 100 is described here as an example of the user equipment itself; however, those skilled in the art can understand that the electronic device 100 can also be implemented as another electronic device having functions of a sending unit 110 and a receiving unit 120 (and optionally a channel detecting unit 130) and, for example, being attached to or in communication with the user equipment. As an example, the following will take the case where the electronic device works in the New Radio-Unlicensed (NR-U) spectrum such as 60 GHz as an example to describe the processing of the electronic device and its respective units, but those skilled in the art can understand that embodiments of the present disclosure are not limited thereto.

According to an embodiment of the present disclosure, when the user equipment is to perform uplink data transmission, for example, the electronic device 100 serving as the user equipment can perform channel detection such as LBT through the optional channel detecting unit 130, and can access the unlicensed frequency band when the result of LBT indicates the channel being idle, so as to obtain COT for uplink data transmission. Here, the channel detection for accessing the unlicensed frequency band may be, for example, complex channel detection such as CAT 4 LBT. For the example case in which the electronic devices operates in the NR-U unlicensed spectrum such as 60 GHz, the electronic device (and transmission reception points serving the electronic device) may communicate using beams in specific directions, and the channel detection performed by the electronic device (and transmission reception points described below) can be a directional LBT related to the beam direction, which will help to improve the spatial multiplexing rate.

The sending unit 110 of the electronic device 100 may be configured to perform the first uplink data transmission to the first transmission reception point within the channel occupancy time COT obtained by the user equipment successfully accessing the unlicensed frequency band. When the amount of data to be transmitted to the first transmission reception point is relatively large and/or the COT length is relatively short, the first uplink data transmission may occupy the entire COT.

On the other hand, when the amount of data to be transmitted to the first transmission reception point is relatively small and/or the COT length is relatively large, there is time remaining after the first uplink data transmission is completed in the COT. Correspondingly, the sending unit 110 may be further configured to, perform, in the remaining period after the first uplink data transmission is completed in the COT, second uplink data transmission to a second transmission reception point in the vicinity of the first transmission reception point based on, for example, an acknowledgment message received by the receiving unit 120 from the second transmission reception point. Here, the acknowledgement message from the second transmission reception point is sent by the second transmission reception point to the electronic device 100 in response to an additional transmission request sent by the first transmission reception point to the second transmission reception point after the first uplink data transmission is completed.

Using the above processing of units of the electronic device 100, in the COT obtained by the user equipment, after the uplink data transmission with the first transmission reception point is completed, the remaining period of the COT can be used for the uplink data transmission with the second transmission reception point. That is, the COT obtained by the user equipment is used for uplink transmission with multiple transmission reception points, which is equivalent to sharing the COT obtained by the user equipment among the multiple transmission reception points, which improves the resource utilization efficiency of the unlicensed frequency band.

Figure 2:
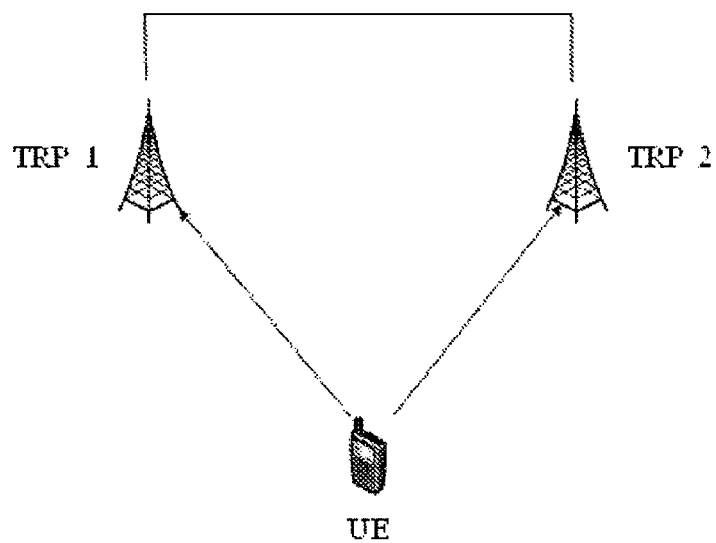
FIG. 2 is a schematic diagram illustrating an example application scenario according to the first embodiment of the present disclosure.

As an example, the first transmission reception point and the second transmission reception point may simultaneously serve the electronic device 100 in a same cell. FIG. 2 is a schematic diagram illustrating an example application scenario of the first embodiment of the present disclosure. As shown in FIG. 2, the first transmission reception point TRP1 and the second transmission reception point TRP2 may provide services for the user equipment UE, which is an example of the electronic device 100, in the same cell (e.g., under the same gNB), and can communicate therebetween through (optical) fiber backhaul. When the first transmission reception point TRP1 and the second transmission reception point TRP2 serve a UE under the same gNB (not shown), an additional transmission request is sent to the second transmission reception point TRP2 by the first transmission reception point TRP1 instead of the UE, so that, for example, the gNB can select an appropriate second transmission reception point and an additional transmission request can be sent to the second transmission reception point through the fiber backhaul, which reduces the processing load and transmission load for the UE to select the appropriate second transmission reception point and send the additional transmission request.

In a preferred embodiment, the sending unit 110 may be further configured to: send, in the channel occupancy time COT, (for example, first) a first transmission request to the first transmission reception point, where the first transmission request includes information related to expiration time of the channel occupancy time COT. As an example, the information related to the expiration time of the COT may include, for example, the duration of the COT, the cutoff time of the COT, and/or the time slots available for sharing. The first transmission reception point receiving the first transmission request may save the information related to the expiration time of the COT therein, and include the information in the additional transmission request to be sent to the second transmission reception point.

In addition, optionally, the sending unit 110 may be further configured to send uplink data to the first transmission reception point together with the first transmission request. At present, both Long Term Evolution (LTE) and New Radio (NR) systems adopt random access with four-step access, that is, the random access process sequentially includes the first message (Msg1, the handshake message sent by the transmitter), the second message (Msg2, the acknowledgement message sent by the receiver), the third message (Msg3, the data sent by the transmitter), and the fourth message (Msg4, the data sent by the receiver) between the transmitter and the receiver. In the above configuration of the sending unit, sending the first transmission request together with the uplink data to the first transmission reception point is equivalent to combining the first message and the third message in the four-step access into one step for transmission. It helps to reduce the transmission overhead, and helps to ensure the continuous occupation of the channel during the transmission process.

Optionally, after the electronic device 100 as the transmitter has occupied the COT through channel detection and sends the first transmission request to the first transmission reception point, the first transmission reception point as the receiver can perform auxiliary first channel detection in response to the first transmission request, so as to facilitate discovery of the hidden node on the side of the first transmission reception point as the receiver. When the result of the first channel detection indicates that there is an idle channel, the first transmission reception point may send an acknowledgement message to the electronic device 100. When the result of the first channel detection indicates that the channel is occupied, the first transmission reception point may randomly back off and perform the channel detection again, e.g., until an idle channel is detected or until the cutoff time of the COT. As an example, the cutoff time of the COT may be determined, for example, according to the information related to the expiration time of the COT included in the first transmission request.

In this case, the sending unit 110 may be further configured to perform the above-mentioned first uplink data transmission in response to, for example, an acknowledgment message received by the receiving unit 120 from the first transmission reception point, the acknowledgment message being sent by the first transmission reception point to the electronic device 100 based on the first channel detection performed in response to the first transmission request. The acknowledgement message sent by the first transmission reception point based on the first channel detection, for example, indicates that the result of the first channel detection indicates that there is an idle channel, so that the electronic device 100 can perform the first uplink data transmission through the sending unit 110 in response to the message.

Here, the first channel detection performed by the first transmission reception point in response to the first transmission request may be simple channel detection such as CAT 2 LBT, or may be complex channel detection such as CAT 4 LBT. When the first channel detection is simple channel detection, when the result of the channel detection indicates an idle channel, the first transmission reception point may only send the above-mentioned acknowledgement message indicating the existence of an idle channel to the electronic device 100. On the other hand, when the first channel detection is complex channel detection, when the result of the channel detection indicates an idle channel, the first transmission reception point may send downlink data to the electronic device 100 together with the above-mentioned acknowledgement message.

Correspondingly, in a preferred embodiment, when the first channel detection of the first transmission reception point is complex channel detection, the receiving unit 120 of the electronic device 100 may be further configured to receive downlink data sent from the first transmission reception point together with the acknowledgement message. Here, the receiving unit 120 receives the downlink data sent together with the acknowledgment message, which is equivalent to combining the second message (Msg2) and the fourth message (Msg4) in the random access of the four-step access described above into one step for receiving, thereby helping to reduce the transmission overhead and ensuring the continuous occupancy of the channel during the transmission process.

Similarly to the auxiliary first channel detection described above with respect to the first transmission reception point, preferably, the second transmission reception point as the receiver can also perform auxiliary second channel detection in response to an additional transmission request from the first transmission reception point detection, in order to facilitate the discovery of the hidden node on the side of the second transmission reception point as the receiver. When the result of the second channel detection indicates that there is an idle channel, the second transmission reception point may send an acknowledgement message to the electronic device 100. When the result of the second channel detection indicates that the channel is occupied, the second transmission reception point may randomly back off and perform the channel detection again, e.g., until an idle channel is detected or until the cutoff time of the COT. As an example, the cutoff time of the COT may be determined according to, for example, information related to the expiration time of the COT included in the additional transmission request.

In this case, the acknowledgement message received by the receiving unit 120 of the electronic device 100 from the second transmission reception point may be sent by the second transmission reception point to the electronic device based on the second channel detection performed in response to the additional transmission request. The acknowledgement message sent by the second transmission reception point based on the second channel detection may, for example, indicate that the result of the second channel detection indicates that there is an idle channel, so that the electronic device 100 can perform second uplink data transmission through the sending unit 110 in response to the message.

Here, the second channel detection performed by the second transmission reception point in response to the additional transmission request may be simple channel detection such as a CAT 2 LBT, or complex channel detection such as a CAT 4 LBT. When the second channel detection is simple channel detection, when the result of the channel detection indicates an idle channel, the second transmission reception point may only send the above-mentioned acknowledgement message indicating the existence of an idle channel to the electronic device 100. On the other hand, when the second channel detection is complex channel detection, when the result of the channel detection indicates an idle channel, the second transmission reception point may send the downlink data to the electronic device 100 together with the above-mentioned acknowledgement message.

Correspondingly, in a preferred embodiment, when the second channel detection of the second transmission reception point is complex channel detection, the receiving unit 120 of the electronic device 100 may be further configured to receive downlink data sent from the second transmission reception point together with the acknowledgement message. Here, the receiving unit 120 receives the downlink data sent together with the acknowledgment message, which is equivalent to combining the second message (Msg2) and the fourth message (Msg4) in the random access of the four-step access described above into one step for receiving, thereby helping to reduce the transmission overhead and ensuring the continuous occupancy of the channel during the transmission process.

The above process related to sharing COT between the electronic device 100 and the first transmission reception point and the second transmission reception point can be appropriately extended to the case of more transmission reception points. In a preferred embodiment, if there is still time remaining in the current COT after the second uplink data transmission between the electronic device 100 and the second transmission reception point is completed, the second transmission reception point can perform processing similar to the above processing of the first transmission reception point, that is, sending an additional transmission request to a third transmission reception point in the vicinity of the second transmission reception point, so as to assist the electronic device 100 to perform a third uplink transmission with that additional third transmission reception point.

In this case, the sending unit 110 of the electronic device 100 may be further configured to: perform, in the remaining period after the second uplink data transmission is completed in the channel occupancy time COT, third uplink data transmission to the third transmission reception point in the vicinity of the second transmission reception point based on an acknowledgement message from the third transmission reception point, wherein the acknowledgement message is sent by the third transmission reception point to the electronic device 100 in response to an additional transmission request, the additional transmission request being sent by the second transmission reception point to the third transmission reception point when the second uplink data transmission is completed.

The configuration example of the electronic device on the user equipment side of the first embodiment of the present disclosure has been described above with reference to FIGS. 1 and 2. As described above, the electronic device according to the first embodiment of the present disclosure enables the COT obtained by the user equipment to be used for uplink transmission with multiple transmission reception points, which is equivalent to sharing the COT obtained by the user equipment among the multiple transmission reception points. Therefore, the resource utilization efficiency of unlicensed frequency bands is improved.

[2.2 Configuration Example of Electronic Device on the First Transmission Reception Point Side]

Figure 3:
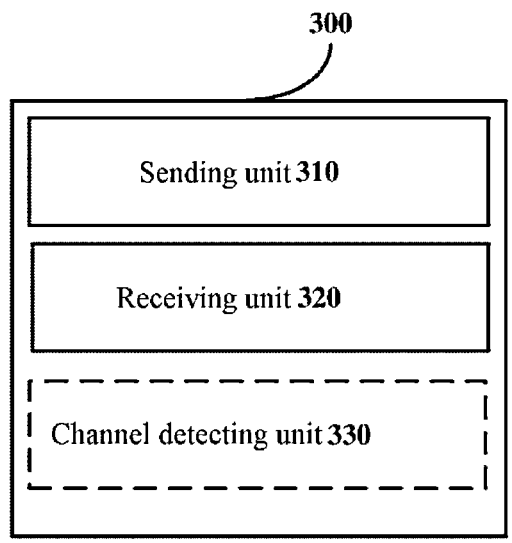
FIG. 3 is a block diagram showing a configuration example of an electronic device on the first transmission reception point side according to the first embodiment of the present disclosure.

FIG. 3 is a block diagram showing a configuration example of an electronic device on the first transmission reception point side according to the first embodiment of the present disclosure.

As shown in FIG. 3, the electronic device 300 may include a sending unit 310, a receiving unit 320 and an optional channel detecting unit 330.

Here, each unit of the electronic device 300 may be included in the processing circuitry. It should be noted that the electronic device 300 may include either one processing circuitry or multiple processing circuitries. Further, the processing circuitry may include various discrete functional units to perform various different functions and/or operations. It should be noted that these functional units may be physical entities or logical entities, and units with different names may be implemented by the same physical entity.

In addition, the electronic device 300 is described here as an example of the first transmission reception point itself; however, those skilled in the art can understand that the electronic device 300 can also be implemented as another electronic device having functions of a sending unit 310 and a receiving unit 320 (and optionally a channel detecting unit 330) and, for example, being attached to or in communication with the first transmission reception point. As an example, the following will take the case where the electronic device works in the New Radio-Unlicensed (NR-U) spectrum such as 60 GHz as an example to describe the processing of the electronic device and its respective units, but those skilled in the art can understand that embodiments of the present disclosure are not limited thereto.

The receiving unit 320 of the electronic device 300 may be configured to receive the first uplink data transmission from the user equipment in the channel occupancy time COT obtained by the user equipment successfully accessing the unlicensed frequency band. When the amount of data of the first uplink data transmission is relatively large and/or the COT length is relatively short, the first uplink data transmission may occupy the entire COT.

On the other hand, when the amount of data of the first uplink data transmission is relatively small and/or the COT length is relatively large, there is still time remaining after the first uplink data transmission is completed in the COT. Correspondingly, the sending unit 310 of the electronic device 300 may be configured to send, in the remaining period after the first uplink data transmission is completed in the COT, an additional transmission request related to second uplink data transmission of the user equipment to another electronic device in the vicinity of the electronic device 300. Said another electronic device is another object for the user equipment to perform uplink data transmission, examples of which may include, but are not limited to, a second transmission reception point that is in the same cell as the electronic device 300 as the first transmission reception point and serves the user equipment. When said another electronic device serving as the second transmission reception point receives an additional transmission request, for example, it can perform corresponding processing and interact with the user equipment, so that the user equipment can perform second uplink data transmission to said another electronic device serving as the second transmission reception point in a remaining period of the COT.

Using the above processing of units of the electronic device 300, in the COT obtained by the user equipment, after the user equipment completes the uplink data transmission with the electronic device 300 as the first transmission reception point, the remaining period of the COT can be used for the user equipment to perform uplink data transmission with another electronic device as the second transmission reception point. That is, assisting the user equipment to use the COT obtained by it for uplink transmission with multiple transmission reception points, which is equivalent to sharing the COT between multiple transmission reception points, thus improving the resource utilization efficiency of the unlicensed frequency band.

Preferably, the sending unit 310 of the electronic device 300 may be further configured to send the additional transmission request to said another electronic device serving as the second transmission reception point through an optical fiber backhaul. For example, the electronic device 300 as the first transmission reception point and said another electronic device as the second transmission reception point may be TRP1 and TRP2 in the example application scenario shown in FIG. 2. As shown in FIG. 2, the first transmission reception point TRP1 and the second transmission reception point TRP2 serve the user equipment UE under the same gNB (not shown), and can communicate with each other through fiber backhaul. The first transmission reception point TRP1, instead of the UE, sends an additional transmission request to the second transmission reception point TRP2, so that for example, the gNB can select an appropriate second transmission reception point and the additional transmission request can be sent to the second transmission reception point through the fiber backhaul, thereby reducing the processing load and transmission load for the UE to select an appropriate second transmission reception point and send additional transmission requests.

In a preferred embodiment, the receiving unit 320 of the electronic device 300 may be further configured to: receive, in the channel occupancy time COT, (for example, first) a first transmission request from the user equipment, where the first transmission request includes information related to the expiration time of the channel occupancy COT. As an example, the information related to the expiration time of the COT may include, for example, the duration of the COT, the cutoff time of the COT, and/or the time slots available for sharing. The electronic device 300 may save the information related to the expiration time of the COT in the first transmission request, and include the information in the additional transmission request to be sent to another electronic device as the second transmission reception point. In other words, the additional transmission request sent by the sending unit 310 to said another electronic device preferably includes information related to the expiration time of the COT.

In addition, optionally, the receiving unit 320 may be further configured to receive, together with the first transmission request, uplink data sent from the user equipment together with the first transmission request. In the above configuration of the receiving unit, receiving the first transmission request and the uplink data together from the user equipment is equivalent to combining the first message and the third message in the random access procedure of the four-step access described above into one step for receiving, thereby helping to reduce the transmission overhead and ensuring continuous occupancy of the channel during the transmission process.

Optionally, after the user equipment as the transmitter has occupied the COT through channel detection and sent the first transmission request to the electronic device 300 as the first transmission reception point, the electronic device 300 as the receiver can use its channel detecting unit 330 to perform channel detection in response to the first transmission request, and may send an acknowledgement message to the user equipment through its sending unit 310 based on the result of the channel detection. The above-mentioned auxiliary channel detection performed by the electronic device 300 is beneficial to discover the hidden node on the side of the electronic device 300 as the receiver.

More specifically, when the result of the channel detection of the channel detecting unit 330 indicates that there is an idle channel, the electronic device 300 may send an acknowledgement message to the user equipment through the sending unit 310. Correspondingly, when the user equipment receives the acknowledgement message sent by the electronic device 300 indicating that there is an idle channel, the user equipment can perform the first uplink data transmission with the electronic device 300 in response to the acknowledgement message. When the result of the channel detection by the channel detecting unit 330 indicates that the channel is occupied, it may randomly back off and perform the channel detection again, for example, until an idle channel is detected or until the cutoff time of the COT. As an example, the cutoff time of the COT may be determined, for example, according to the information related to the expiration time of the COT included in the first transmission request received by the receiving unit 320.

Here, the channel detection performed by the channel detecting unit 330 in response to the first transmission request may be simple channel detection such as CAT 2 LBT, or complex channel detection such as CAT 4 LBT. When the channel detection is simple channel detection, the sending unit 310 of the electronic device 300 may be configured to, for example, only send the above acknowledgement message indicating the existence of an idle channel to the user equipment when the result of the channel detection indicates an idle channel.

On the other hand, when the channel detection performed by the channel detecting unit 330 in response to the first transmission request is complex channel detection, the sending unit 310 of the electronic device 300 may be configured to send, for example, downlink data together with the above acknowledgement message to the user equipment when the result of the channel detection indicates an idle channel. This configuration of the sending unit is equivalent to combining the second message (Msg2) and the fourth message (Msg4) in the random access of the four-step access described above into one step for sending, thereby helping to reduce transmission overhead and ensure the continuous occupation of the channel during the transmission process.

The configuration example of the electronic device on the first transmission reception point side of the first embodiment of the present disclosure has been described above with reference to FIG. 3. As described above, the electronic device on the side of the first transmission reception point according to the first embodiment of the present disclosure enables the user equipment to use the COT obtained by the user equipment for uplink transmission with multiple transmission reception points, which is equivalent to share the COT obtained by the user equipment among the multiple transmission reception points, thereby improving the resource utilization efficiency of the unlicensed frequency band.

[2.3 Configuration Example of Electronic Device on the Second Transmission Reception Point Side]

Figure 4:
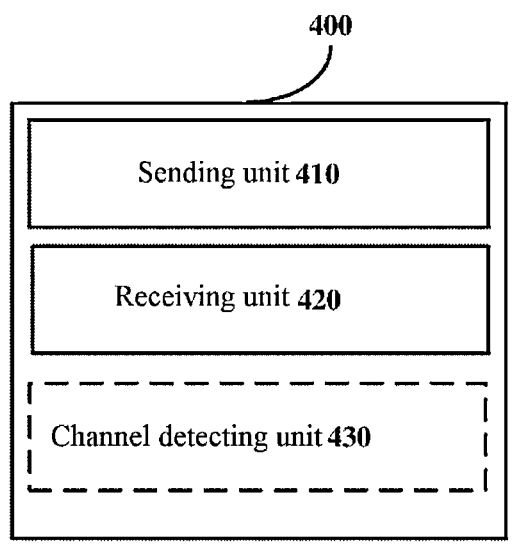
FIG. 4 is a block diagram showing a configuration example of an electronic device on the second transmission reception point side according to the first embodiment of the present disclosure.

FIG. 4 is a block diagram showing a configuration example of an electronic device on the second transmission reception point side according to the first embodiment of the present disclosure.

As shown in FIG. 4, the electronic device 400 may include a sending unit 410, a receiving unit 420 and an optional channel detecting unit 430.

Here, each unit of the electronic device 400 may be included in the processing circuitry. It should be noted that the electronic device 400 may include either one processing circuitry or multiple processing circuitries. Further, the processing circuitry may include various discrete functional units to perform various different functions and/or operations. It should be noted that these functional units may be physical entities or logical entities, and units with different names may be implemented by the same physical entity.

In addition, the electronic device 400 is described here as an example of the second transmission reception point itself; however, those skilled in the art can understand that the electronic device 400 can also be implemented as another electronic device having functions of a sending unit 410 and a receiving unit 420 (and optionally a channel detecting unit 430) and, for example, being attached to or in communication with the second transmission reception point. As an example, the following will take the case where the electronic device works in the New Radio-Unlicensed (NR-U) spectrum such as 60 GHz as an example to describe the processing of the electronic device and its respective units, but those skilled in the art can understand that embodiments of the present disclosure are not limited thereto.

The receiving unit 420 of the electronic device 400 may be configured to receive an additional transmission request related to the user equipment from another electronic device within the remaining period of the channel occupancy time COT obtained by the user equipment successfully accessing the unlicensed frequency band, wherein the additional transmission request is sent by said another electronic device after the first uplink data transmission from the user equipment is completed in the COT. Here, the user equipment firstly performs the first uplink data transmission to said another electronic device in the COT obtained by successfully accessing the unlicensed frequency band, and the amount of data of the first uplink data transmission is relatively small and/or the length of the COT is relatively long, so that there is still remaining period after the first uplink data transmission is completed in the COT. After the first uplink data transmission is completed, the above-mentioned another electronic device, instead of the user equipment, sends an additional transmission request to the electronic device 400 serving as the second transmission reception point within the remaining period of the COT. Here, another electronic device is the object of the first uplink data transmission performed by the user equipment, examples of which may include, but are not limited to, the first transmission reception point that is in the same cell as the electronic device 400 as the second transmission reception point and serves the user equipment.

The sending unit 410 of the electronic device 400 may be configured to send acknowledgement message to the user equipment in response to the additional transmission request received by the receiving unit 420. The receiving unit 420 of the electronic device 400 may be further configured to receive, in a remaining period of the COT, the second uplink data transmission performed by the user equipment based on the acknowledgement message.

With the above processing of units of the electronic device 400, in the COT obtained by the user equipment, after the uplink data transmission with another electronic device serving as, for example, the first transmission reception point is completed, the remaining period of the COT can be used for uplink data transmission with the electronic device 400 as the second transmission reception point. Correspondingly, the electronic device 400 as the second transmission reception point shares the COT obtained by the user equipment with, for example, another electronic device as the first transmission reception point (the COT obtained by the user equipment is shared among multiple transmission reception points). Thus, the resource utilization efficiency of the unlicensed frequency band is improved.

Preferably, the receiving unit 420 of the electronic device 400 may also be configured to receive an additional transmission request from, for example, another electronic device serving as the first transmission reception point via the optical fiber backhaul. As an example, another electronic device as the first transmission reception point and the electronic device 400 as the second transmission reception point may be TRP1 and TRP2 in the example application scenario shown in FIG. 2. As shown in FIG. 2, the first transmission reception point TRP1 and the second transmission reception point TRP2 serve the user equipment UE under the same gNB (not shown), and communicate therebetween through fiber backhaul. The second transmission reception point TRP2 receives the additional transmission request sent by the first transmission reception point TRP1 instead of the UE, so that, for example, the gNB can select an appropriate second transmission reception point and the additional transmission request can be sent to the second transmission reception point through the fiber backhaul, thereby reducing the processing load and transmission load for the UE to select an appropriate second transmission reception point and send an additional transmission request.

In a preferred embodiment, the additional transmission request received by the receiving unit 420 of the electronic device 400 from, for example, another electronic device serving as the first transmission reception point includes information related to the expiration time of the channel occupancy time COT. As an example, the information related to the expiration time of the COT may include, for example, the duration of the COT, the cutoff time of the COT, and/or the time slots available for sharing. For example, the above information may be obtained from the user equipment by another electronic device serving as the first transmission reception point in the process of communicating with the user equipment.

Optionally, after the COT is occupied in advance by channel detection by the user equipment serving as the transmitter, and an additional transmission request is sent to the electronic device 400 serving as the second transmission reception point by, for example, another electronic device serving as the first transmission reception point instead of the user equipment, the electronic device 400 as the receiver may perform auxiliary channel detection in response to the additional transmission request, and may send an acknowledgement message to the user equipment through its sending unit 410 based on the result of the channel detection. The above-mentioned auxiliary channel detection performed by the electronic device 400 is beneficial to discover the hidden node on the side of the electronic device 400 as the receiver.

More specifically, when the result of the channel detection of the channel detecting unit 430 indicates that there is an idle channel, the electronic device 400 may send an acknowledgement message to the user equipment through the sending unit 410. Correspondingly, when the user equipment receives the acknowledgement message sent by the electronic device 400 indicating that there is an idle channel, the user equipment can perform second uplink data transmission with the electronic device 400 in response to the acknowledgement message. When the result of the channel detection by the channel detecting unit 430 indicates that the channel is occupied, it may randomly back off and perform the channel detection again, for example, until an idle channel is detected or until the cutoff time of the COT. As an example, the cutoff time of the COT may be determined, for example, according to the information related to the expiration time of the COT included in the additional transmission request received by the receiving unit 420.

Here, the channel detection performed by the channel detecting unit 430 in response to the additional transmission request may be simple channel detection such as CAT 2 LBT or complex channel detection such as CAT 4 LBT. When the channel detection is simple channel detection, the sending unit 410 of the electronic device 400 may be configured to, for example, only send the above acknowledgement message indicating the existence of an idle channel to the user equipment when the result of the channel detection indicates an idle channel.

On the other hand, when the channel detection performed by the channel detecting unit 430 in response to the first transmission request is complex channel detection, the sending unit 410 of the electronic device 400 may be configured to send, for example, when the result of the channel detection indicates an idle channel, downlink data together with the above acknowledgement message to the user equipment. This configuration of the sending unit is equivalent to combining the second message (Msg2) and the fourth message (Msg4) in the random access of the four-step access described above into one step for sending, thereby helping to reduce transmission overhead and ensure the continuous occupation of the channel during the transmission process.

The configuration example of the electronic device on the second transmission reception point side of the first embodiment of the present disclosure has been described above with reference to FIG. 4. As described above, the electronic device on the second transmission reception point side according to the first embodiment of the present disclosure can share the COT obtained by the user equipment with another electronic device serving as the first transmission reception point (the COT obtained by the user equipment is shared among a plurality of transmission reception points), thereby improving the resource utilization efficiency of the unlicensed frequency band.

[2.4 Example of Sharing COT]

Figure 5:
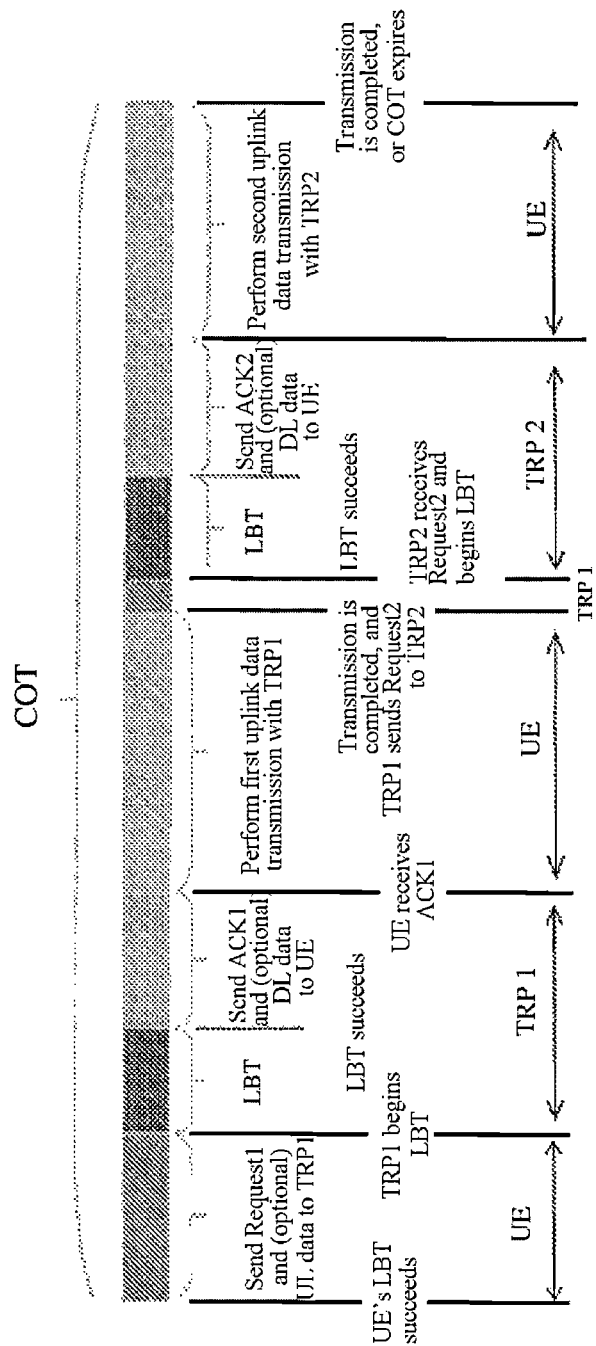
FIG. 5 is a schematic diagram illustrating an example of sharing a COT according to the first embodiment of the present disclosure.

For ease of understanding, FIG. 5 shows a schematic diagram of an example of sharing a COT according to the first embodiment of the present disclosure.

As shown in FIG. 5, the first transmission reception point TRP1 and the second transmission reception point TRP2 implemented by, for example, the electronic device 300 and the electronic device 400 shown in FIG. 3 and FIG. 4 respectively, share the COT obtained by the user equipment UE implemented by, for example, the electronic device 100 shown in FIG. 1.

Specifically, the user equipment UE obtains the channel occupancy time COT by successfully performing LBT (e.g., CAT 4 LBT), and sends a first transmission request Request1 including information related to the expiration time of the COT, and optionally uplink data UL data, to the first transmission reception point TRP1.

TRP1 performs LBT (e.g. CAT 2 LBT as simple channel detection or CAT 4 LBT as complex channel detection) in response to the first transmission request, and sends an acknowledgment message ACK1 to the UE when the LBT succeeds. When TRP1 performs CAT 4 LBT as complex channel detection, TRP1 sends downlink data DL data to the UE together with the acknowledgment message ACK1.

Next, the UE receives the acknowledgment message ACK1 from the TRP1, and performs the first uplink data transmission with the TRP1 in response to the acknowledgment message ACK1.

After the UE and TRP1 complete the first uplink data transmission, if there is still time remaining in the current COT, TRP1 instead of the UE sends an additional transmission request Request2 for the second uplink data transmission of the UE to TRP2 near TRP1.

After TRP2 receives the additional transmission request Request2, it can perform LBT (for example, CAT 2 LBT as simple channel detection or CAT 4 LBT as complex channel detection), and send an acknowledgement message ACK2 to the UE when the LBT succeeds. When TRP2 performs CAT 4 LBT as complex channel detection, TRP2 sends downlink data DL data to the UE together with the acknowledgement message ACK2.

Correspondingly, the UE may perform second uplink data transmission with TRP2 in response to the acknowledgment message ACK2 from TRP2, until the transmission is completed or the COT expires.

The configuration examples of the electronic devices according to the first embodiment of the present disclosure have been described above with reference to FIGS. 1 to 5, and these configuration examples of the electronic devices enable the COT obtained by the user equipment to be shared between the user equipment and a plurality of transmission reception points, thereby improving the resource utilization of unlicensed frequency bands.

3. CONFIGURATION EXAMPLES OF THE SECOND EMBODIMENT (UPLINK SCENARIO)

[3.1 Configuration Example of Electronic Device on the User Equipment Side]

Figure 6:
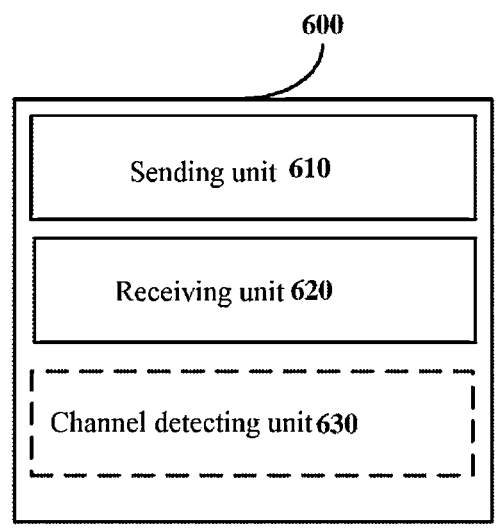
FIG. 6 is a block diagram showing a configuration example of an electronic device on the user equipment side according to a second embodiment of the present disclosure.

FIG. 6 is a block diagram showing a configuration example of the electronic device on the user equipment side according to the second embodiment of the present disclosure.

As shown in FIG. 6, the electronic device 600 may include a sending unit 610, a receiving unit 620 and an optional channel detecting unit 630.

Here, each unit of the electronic device 600 may be included in the processing circuitry. It should be noted that the electronic device 600 may include either one processing circuitry or multiple processing circuitries. Further, the processing circuitry may include various discrete functional units to perform various different functions and/or operations. It should be noted that these functional units may be physical entities or logical entities, and units with different names may be implemented by the same physical entity.

In addition, the electronic device 600 is described here as an example of the user equipment itself; however, those skilled in the art can understand that the electronic device 600 can also be implemented as another electronic device having functions of a sending unit 610 and a receiving unit 620 (and optionally a channel detecting unit 630) and, for example, being attached to or in communication with the user equipment. As an example, the following will describe the processing of the electronic device and its various units by taking the case where the electronic device operates in the NR-U unlicensed spectrum such as 60 GHz as an example, but those skilled in the art can understand that the embodiments of the present disclosure are not limited to this.

According to the second embodiment of the present disclosure, when, for example, two transmission reception points wish to perform downlink data transmission to the electronic device 600 as user equipment at the same time, they can send transmission requests to the electronic device 600 at the same time, so that the electronic device 600 as the user equipment accesses the unlicensed frequency band in response to the transmission request and obtains the COT, and thus these transmission reception points can use the COT of the user equipment to transmit downlink data.

To this end, the receiving unit 620 of the electronic device 600 may receive transmission requests from the first transmission reception point and the second transmission reception point.

In a preferred embodiment, in response to the transmission request, the electronic device 600 may perform channel detection such as LBT through the optional channel detecting unit 630, and access an unlicensed frequency band to obtain COT based on the result of the channel detection. For example, the electronic device 600 may access the unlicensed frequency band when the result of the channel detection of the channel detecting unit 630 indicates that the channel is idle, thereby obtaining the COT. Here, the channel detection performed by the electronic device 600 for accessing the unlicensed frequency band may be, for example, complex channel detection such as CAT 4 LBT. For the example case where the electronic device operates in the NR-U unlicensed spectrum such as 60 GHz, the electronic device (and transmission reception points serving the electronic devices) may communicate using beams in specific directions, and the channel detection performed by the electronic devices (and the channel detection by the transmission reception points described below) can be a directional LBT related to the beam direction, which will help to improve the spatial multiplexing rate.

In the COT obtained by the electronic device 600 successfully accessing the unlicensed frequency band in response to the transmission request, the sending unit 610 of the electronic device 600 may send an acknowledgement message simultaneously to the first transmission reception point and the second transmission reception point. The first transmission reception point and the second transmission reception point that have received the acknowledgement message may simultaneously send downlink data to the electronic device 600 within the COT.

Correspondingly, the receiving unit 620 of the electronic device 600 can simultaneously receive downlink data from the first transmission reception point and the second transmission reception point within the COT.

Using the above processing of units of the electronic device 600, the COT can be obtained at the user equipment side in response to the transmission requests of the first transmission reception point and the second transmission reception point, and the COT can be used for the downlink data transmission of these transmission reception points. That is, the COT obtained by the user equipment is shared among multiple transmission reception points, thereby improving the resource utilization efficiency of the unlicensed frequency band.

Figure 7:
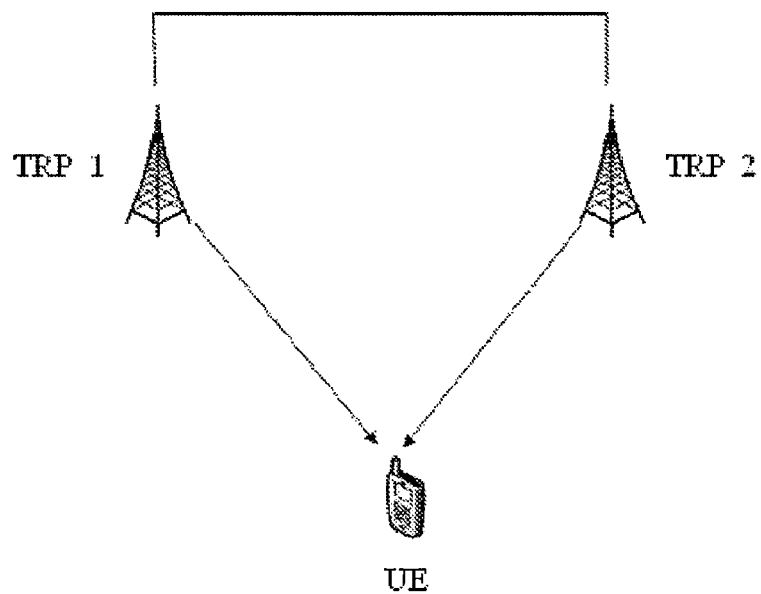
FIG. 7 is a schematic diagram illustrating an example application scenario of the second embodiment of the present disclosure.

As an example, the first transmission reception point and the second transmission reception point may provide Coordinated Multiple Points Transmission-Joint Transmission (COMP-JT) for the user equipment. FIG. 7 is a schematic diagram illustrating an example application scenario of the second embodiment of the present disclosure. As shown in FIG. 7, the first transmission reception point TRP1 and the second transmission reception point TRP2 provide coordinated multi-point transmission joint transmission for the user equipment UE, which is an example of the electronic device 600. At this time, it can be considered that the downlink data sent by the network side to the UE is divided into two parts, and the data is simultaneously sent to the UE through the COMP-JT via TRP1 and TRP2. For example, the content and data amount of downlink data sent via TRP1 and TRP2 can be reasonably allocated according to factors such as the qualities of the link between TRP1 and the UE and the link between TRP2 and the UE. Those skilled in the art can implement the details of downlink data transmission between each of TRP1 and TRP2 and the UE according to various existing manners for implementing COMP-JT, which will not be repeated here.

In a preferred embodiment, the acknowledgement message which is sent, after the electronic device 600 successfully accesses the unlicensed frequency band and obtains the COT in response to the transmission request, by the sending unit 610 to the first transmission reception point and the second transmission reception point may include information related to the expiration time of the channel occupancy time COT. As an example, the information related to the expiration time of the COT may include, for example, the duration of the COT, the cutoff time of the COT, and/or the time slots available for sharing. The first transmission reception point and the second transmission reception point receiving the acknowledgement message may save the information related to the expiration time of the COT therein.

In addition, optionally, the sending unit 610 may be further configured to simultaneously send uplink data to the first transmission reception point and the second transmission reception point together with the above acknowledgement message. In the above configuration of the sending unit, sending the acknowledgment message together with the uplink data to the first transmission reception point and the second transmission reception point helps to reduce the transmission overhead, and helps to ensure the continuous occupation of the channel during the transmission process.

The configuration example of the electronic device on the user equipment side of the second embodiment of the present disclosure has been described above with reference to FIGS. 6 and 7. As described above, the electronic device according to the second embodiment of the present disclosure enables the COT obtained by the user equipment to be used for the downlink transmission to the user equipment by multiple transmission reception points, which is equivalent to sharing the COT obtained by the user equipment among the multiple transmission reception points, thus improving the resource utilization efficiency of the unlicensed frequency band.

[3.2 Configuration Example of Electronic Device on the Transmission Reception Point Side]

Figure 8:
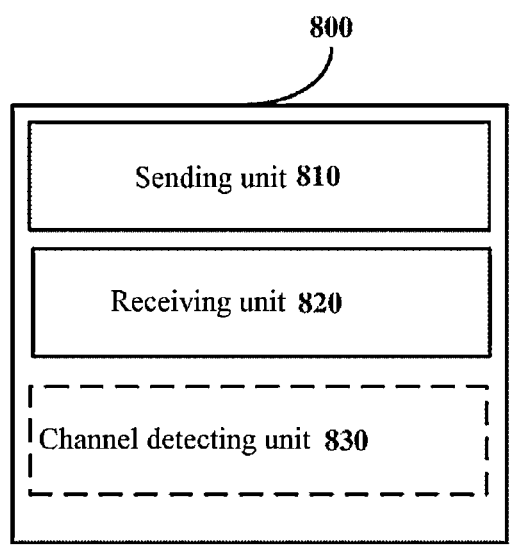
FIG. 8 is a block diagram showing a configuration example of an electronic device on the transmission reception point side according to the second embodiment of the present disclosure.

FIG. 8 is a block diagram showing a configuration example of the electronic device on the transmission reception point side according to the second embodiment of the present disclosure.

As shown in FIG. 8, the electronic device 800 may include a sending unit 810, a receiving unit 820 and an optional channel detecting unit 830.

Here, each unit of the electronic device 800 may be included in the processing circuitry. It should be noted that the electronic device 800 may include either one processing circuitry or multiple processing circuitries. Further, the processing circuitry may include various discrete functional units to perform various different functions and/or operations. It should be noted that these functional units may be physical entities or logical entities, and units with different names may be implemented by the same physical entity.

In addition, the electronic device 800 is described here as an example of the transmission reception point itself; however, those skilled in the art will understand that the electronic device 800 can also be implemented as another electronic device having functions of a sending unit 810 and a receiving unit 820 (and optionally a channel detecting unit 830) and, for example, being attached to or in communication with the transmission reception point. As an example, the following will describe the processing of the electronic device and its various units by taking the case where the electronic device operates in the NR-U unlicensed spectrum such as 60 GHz as an example, but those skilled in the art can understand that the embodiments of the present disclosure are not limited to this.

According to the second embodiment of the present disclosure, when, for example, two transmission reception points wish to transmit downlink data to the user equipment at the same time, they can send transmission requests to the user equipment at the same time, so that the user equipment accesses the unlicensed frequency band in response to the transmission request(s) and obtain the COT, and thus these transmission reception points can use the COT of the user equipment to send downlink data at the same time. In the following description, the electronic device 800 will be described as the first transmission reception point of the two transmission reception points, and the second transmission reception point of the two transmission reception points may have the same functional configuration as the electronic device 800 and perform the same processing at the same time.

Specifically, the sending unit 810 of the electronic device 800 serving as the first transmission reception point may send a transmission request to the user equipment. In response to the transmission request, the user equipment may, for example, perform channel detection and access an unlicensed frequency band to obtain COT based on the result of the channel detection.

Correspondingly, the receiving unit 820 of the electronic device 800 may receive the acknowledgement message from the user equipment in the COT, which is obtained by the user equipment successfully accessing the unlicensed frequency band in response to the transmission request. The sending unit 810 of the electronic device 800 may send, in response to the acknowledgement message received by the receiving unit 820, downlink data to the user equipment in the COT.

Here, the respective sending units and receiving units of the electronic device 800 as the first transmission reception point and another electronic device as the second transmission reception point may be configured to simultaneously perform processing of sending a transmission request, receiving an acknowledgment message, and sending downlink data.

Using the above processing of the respective units of the two electronic devices as the first and second transmission reception points, the user equipment side can be made to obtain the COT in response to the transmission requests of the first transmission reception point and the second transmission reception point, and the COT can be used for the downlink data transmission of these transmission reception points. That is, the COT obtained by the user equipment is shared among multiple transmission reception points, thereby improving the resource utilization efficiency of the unlicensed frequency band.

As an example, the electronic device 800 as the first transmission reception point and said another electronic device as the second transmission reception point may provide coordinated multi-point transmission-joint transmission (COMP-JT) for the user equipment. For example, the above two electronic devices may be the first transmission reception point TRP1 and the second transmission reception point TRP2 as shown in FIG. 7 respectively, and provide coordinated multi-point transmission-joint transmission for the user equipment UE.

Optionally, before the respective sending units of the electronic device 800 as the first transmission reception point and another electronic device as the second transmission reception point send transmission requests to the user equipment, the respective optional channel detecting units of the two electronic devices may perform the first channel detection simultaneously, and the respective sending units of the two electronic devices may send transmission requests to the user equipment based on the results of the first channel detection. As an example, the first channel detection here may be simple channel detection such as CAT 2 LBT.

Preferably, the sending unit 810 of the electronic device 800 may be configured to send a transmission request to the user equipment only when the result of the first channel detection of the electronic device 800 and the result of the first channel detection of another electronic device both indicate that there is an idle channel. When the results of the channel detection of the channel detecting units of the two electronic devices indicate that one of the channels is occupied, the two electronic devices can randomly back off and perform channel detection again, for example, until the channel detecting units of both electronic devices detect an idle channel or until a preset stop condition.

This configuration of the electronic device is conducive to discovering hidden nodes on the electronic device side, and is conducive to avoiding the situation where the user equipment is required to occupy the COT when one of the electronic devices cannot perform downlink data transmission because the channel is occupied, which situation results in wasting COT resources.

In one example, in the COT obtained by the user equipment successfully accessing the unlicensed frequency band in response to the transmission request, the respective receiving units of the electronic device 800 as the first transmission reception point and said another electronic device as the second transmission reception point receive an acknowledgement message from the user equipment that may include information related to the expiration time of the channel occupancy time COT. As an example, the information related to the expiration time of the COT may include, for example, the duration of the COT, the cutoff time of the COT, and/or the time slots available for sharing. The electronic device that receives the acknowledgement message may save the information related to the expiration time of the COT therein.

In addition, optionally, the respective receiving units of the electronic device 800 as the first transmission reception point and said another electronic device as the second transmission reception point may be further configured to receive uplink data sent from the user equipment together with the acknowledgement message. In the above configuration of the receiving unit, the uplink data is received from the user equipment together with the acknowledgement message, thereby helping to reduce the transmission overhead and ensure the continuous occupation of the channel during the transmission process.

Optionally, the respective receiving units of the electronic device 800 as the first transmission reception point and said another electronic device as the second transmission reception point may be further configured to perform second channel detection in response to the acknowledgement message received from the user equipment, and send downlink data to the user equipment based on the result of the second channel detection. As an example, the second channel detection here may be simple channel detection such as CAT 2 LBT.

Preferably, the sending unit 810 of the electronic device 800 can be configured to send downlink data to the user equipment only when the results of the second channel detection of the electronic device 800 and the second channel detection of another electronic device both indicate that there is an idle channel. When the results of the channel detection of the channel detecting units of the two electronic devices indicate that one of the channels is occupied, the two electronic devices can randomly back off and perform channel detection again, for example, until the channel detecting units of both electronic devices detect an idle channel or until the cutoff time of the COT. As an example, the cutoff time of the COT may be determined, for example, according to the information related to the expiration time of the COT included in the acknowledgement message received by the receiving unit of the electronic device.

This configuration of the electronic device is helpful for discovering hidden nodes on the side of the electronic device, and is helpful for avoiding a situation in which one of the electronic devices fails to transmit downlink data because the channel is occupied.

The configuration example of the electronic device on the transmission reception point side of the second embodiment of the present disclosure has been described above with reference to FIG. 8. As described above, the electronic device on the transmission reception point side according to the second embodiment of the present disclosure enables the COT obtained by the user equipment to be used for the downlink transmission to the user equipment by multiple transmission reception points, which is equivalent to sharing the COT obtained by the user equipment between multiple transmission reception points, thereby improving the resource utilization efficiency of the unlicensed frequency band.

[3.3 Example of Sharing COT]

Figure 9:
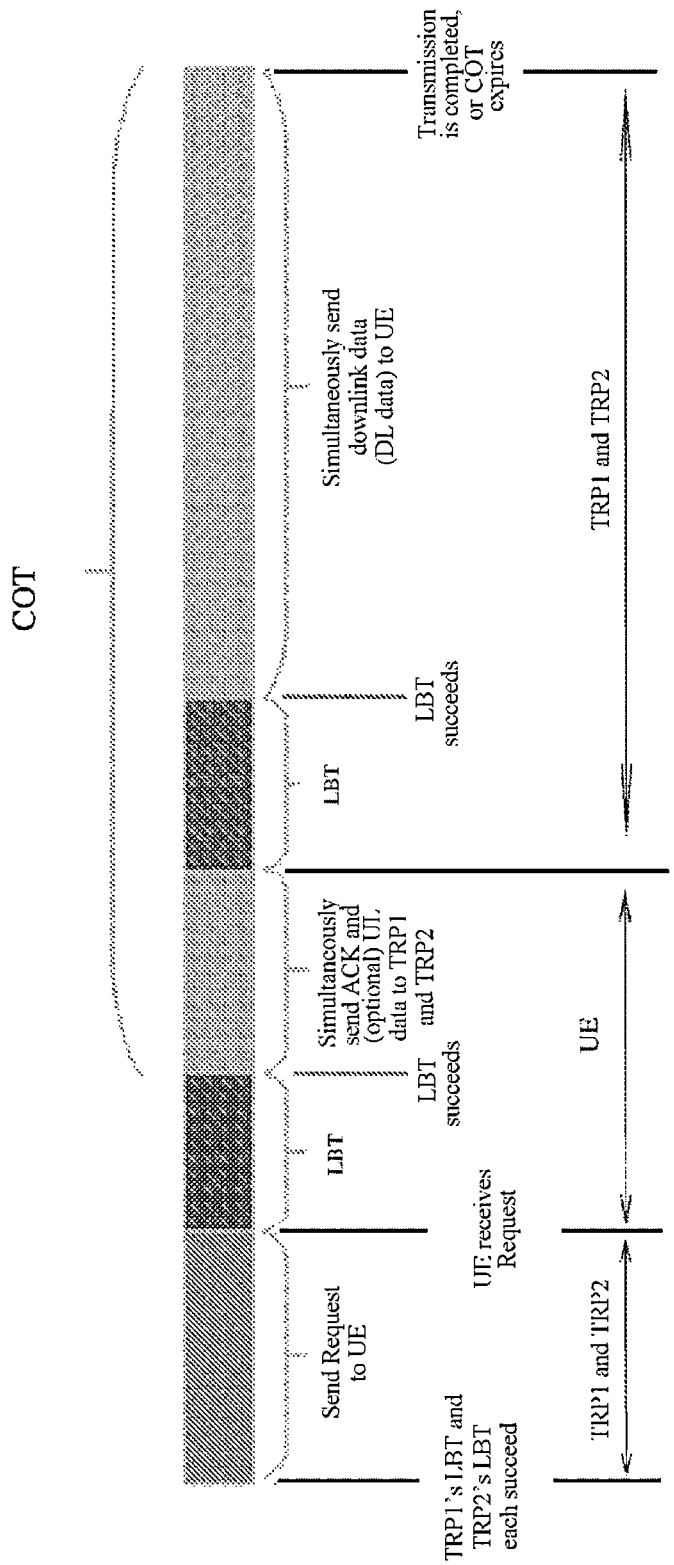
FIG. 9 is a schematic diagram illustrating an example of sharing a COT according to the second embodiment of the present disclosure.

For ease of understanding, FIG. 9 shows a schematic diagram of an example of sharing a COT according to the second embodiment of the present disclosure.

As shown in FIG. 9, the first transmission reception point TRP1 and the second transmission reception point TRP2 each implemented by, for example, the electronic device 800 shown in FIG. 8 share the COT obtained by the user equipment UE implemented by, for example, the electronic device 600 shown in FIG. 6.

Specifically, the first transmission reception point TRP1 and the second transmission reception point TRP2 perform LBT (for example, CAT 2 LBT) at the same time, and send a transmission request Request to the user equipment UE when both LBTs succeed.

The UE receives the transmission request Request, and performs LBT (for example, CAT 4 LBT as complex channel detection) in response to the transmission request Request, and obtains the channel occupancy time COT after the LBT succeeds. Next, the UE sends an acknowledgement message ACK including information related to the expiration time of the COT, and optionally uplink data UL data, to TRP1 and TRP2 at the same time.

TRP1 and TRP2 receive the acknowledgment message ACK and perform LBT (e.g. CAT 2 LBT as simple channel detection) in response to the acknowledgment message ACK, and simultaneously send downlink data DL data to the UE when both LBTs succeed until the transmission is completed or until the COT expires.

The configuration examples of the respective electronic devices according to the second embodiment of the present disclosure are described above with reference to FIGS. 6 to 9, and the configuration examples of the electronic devices enable the COT obtained by the user equipment to be shared between the user equipment and a plurality of transmission reception points, thereby improving the resource utilization of unlicensed frequency bands.

4. METHOD EMBODIMENTS

Next, the methods performed in the electronic devices according to the embodiments of the present disclosure will be described in detail. Note that these method implementations correspond to the device configuration examples described above with reference to FIGS. 1 to 9, and thus the various details and benefits of the above device configuration examples apply as appropriate to the following method embodiments.

[4.1 Method Embodiments of the First Embodiment (Uplink Scenario)]

Figure 10:
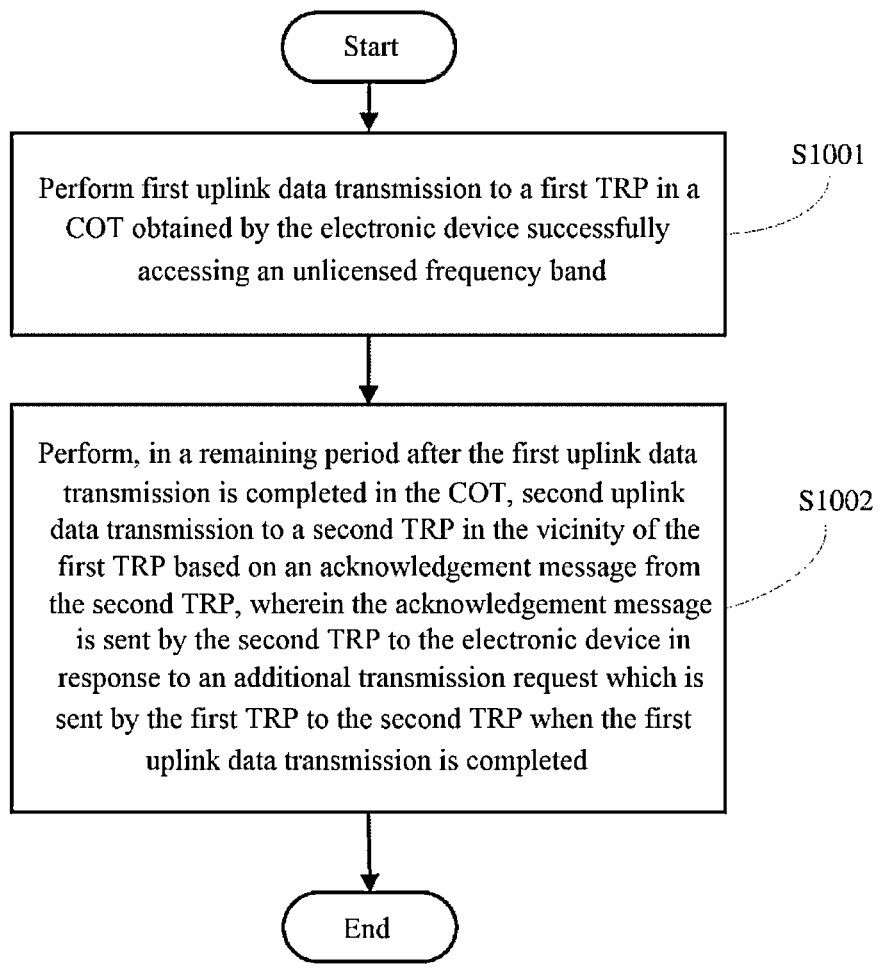
FIG. 10 is a flowchart illustrating a process example of a wireless communication method on the user equipment side according to the first embodiment of the present disclosure.

FIG. 10 is a flowchart illustrating a process example of the wireless communication method on the user equipment side according to the first embodiment of the present disclosure, which may be implemented by, for example, the electronic device 100 on the user equipment side described with reference to FIG. 1.

As shown in FIG. 10, in step S1001, the first uplink data transmission to the first transmission reception point is performed within the channel occupancy time obtained by the electronic device serving as the user equipment successfully accessing the unlicensed frequency band. Next, in step S1002, in the remaining period after the first uplink data transmission is completed in the channel occupied time, based on the acknowledgement message from the second transmission reception point in the vicinity of the first transmission reception point, second uplink data transmission to the second transmission reception point performs is performed. Here, the acknowledgement message is sent by the second transmission reception point to the electronic device in response to an additional transmission request, which additional transmission request is sent by the first transmission reception point to the second transmission reception point after the first uplink data transmission is completed.

As an example, the first transmission reception point and the second transmission reception point serve the electronic device simultaneously in the same cell.

Optionally, the wireless communication method may further include: sending, in the channel occupancy time, a first transmission request to the first transmission reception point, where the first transmission request includes an expiration time related to the channel occupancy time Information. In addition, the wireless communication method may further include: sending uplink data to the first transmission reception point together with the first transmission request.

Optionally, the wireless communication method may further include: performing the first uplink data transmission described in step S1001 in response to an acknowledgement message from the first transmission reception point, the acknowledgement message being sent by the first transmission reception point to the electronic device based on the first channel detection which is performed in response to the first transmission request.

In one example, the first channel detection is complex channel detection, and the wireless communication method may further include: receiving downlink data sent from the first transmission reception point together with an acknowledgment message.

Furthermore, in one example, the acknowledgement message from the second transmission reception point is sent by the second transmission reception point to the electronic device based on second channel detection which is performed in response to the additional transmission request. Optionally, the second channel detection is complex channel detection, and the wireless communication method may further include: receiving downlink data sent from the second transmission reception point together with the acknowledgement message.

Optionally, the wireless communication method can be extended to the third transmission reception point. For example, the wireless communication method may include: performing, in the remaining period after the second uplink data transmission is completed in the channel occupancy time, third uplink data transmission to the third transmission reception point in the vicinity of the second transmission reception point based on an acknowledgement message from the third transmission reception point, wherein the acknowledgement message is sent by the third transmission reception point to the electronic device in response to an additional transmission request which is sent by the second transmission reception point to the third transmission reception point after the second uplink data transmission is completed.

According to an embodiment of the present disclosure, the subject performing the above method may be the electronic device 100 according to the first embodiment of the present disclosure, so various aspects of the foregoing embodiment about the electronic device 100 and its functional units are applicable to this method.

Figure 11:
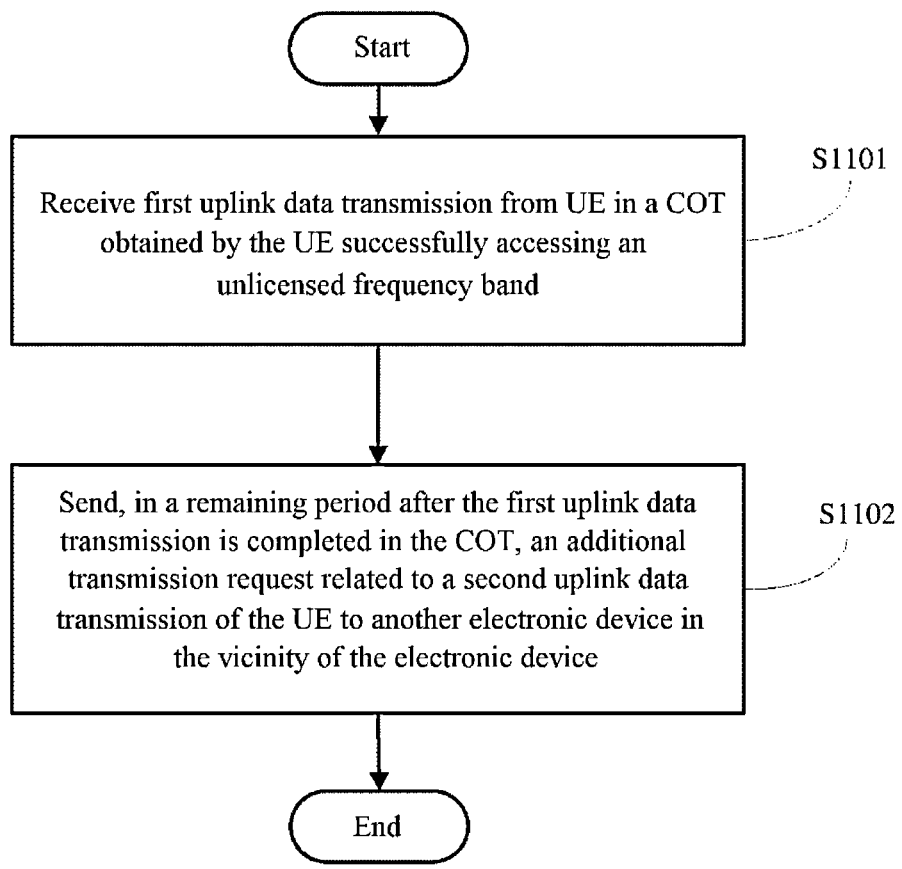
FIG. 11 is a flowchart illustrating a process example of a wireless communication method on the first transmission reception point side according to the first embodiment of the present disclosure.

FIG. 11 is a flowchart illustrating a process example of the wireless communication method on the first transmission reception point side according to the first embodiment of the present disclosure, which may be implemented by, for example, the electronic device 300 on the first transmission reception point side described with reference to FIG. 3.

As shown in FIG. 11, in the wireless communication method in the electronic device as the first transmission reception point, in step S1101, in the channel occupancy time which is obtained by the user equipment successfully accessing an unlicensed frequency band, the first uplink data transmission from the user equipment is received. Next, in step S1102, in the remaining period after the first uplink data transmission is completed in the channel occupancy time, an additional transmission request related to second uplink data transmission of the user equipment is sent to another electronic device in the vicinity of the electronic device.

As an example, the electronic device and said another electronic device may simultaneously provide services for the user equipment in the same cell. Preferably, in step S1102, the additional transmission request may be sent to said another electronic device through a fiber backhaul.

Preferably, the additional data transmission request sent in step S1102 may include information related to the expiration time of the channel occupancy time.

Optionally, the wireless communication method may further include: in the channel occupancy time, receiving a first transmission request from the user equipment, where the first transmission request includes information related to expiration time of the channel occupancy time.

In addition, the wireless communication method may further include: receiving uplink data sent from the user equipment together with the first transmission request.

Optionally, the wireless communication method may further include: performing channel detection in response to the first transmission request, and sending an acknowledgement message to the user equipment based on a result of the channel detection.

In one example, the channel detection is simple channel detection. In another example, the channel detection is complex channel detection, and the wireless communication method may further include: sending downlink data to the user equipment together with the acknowledgement message.

According to an embodiment of the present disclosure, the subject performing the above method may be the electronic device 300 according to the first embodiment of the present disclosure, so various aspects of the foregoing embodiment about the electronic device 300 and its functional units are applicable to this method.

Figure 12:
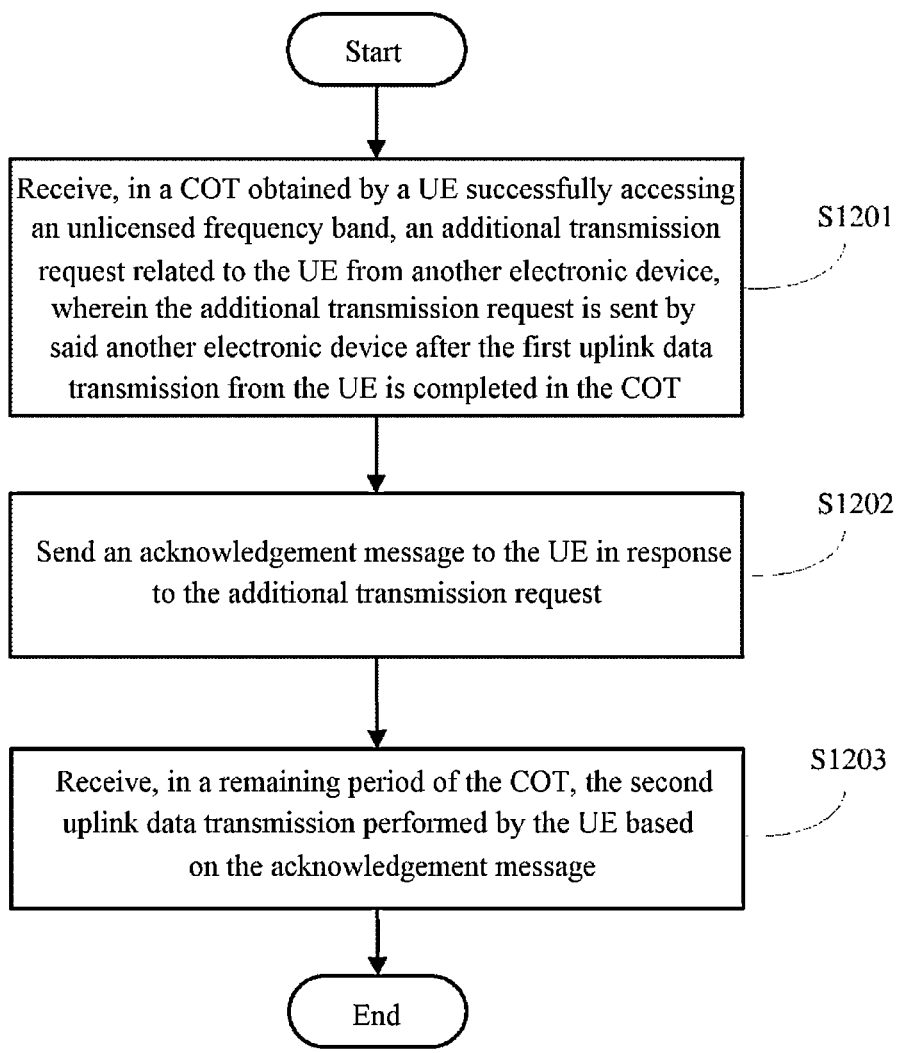
FIG. 12 is a flowchart illustrating a process example of a wireless communication method on the second transmission reception point side according to the first embodiment of the present disclosure.

FIG. 12 is a flowchart illustrating a process example of the wireless communication method on the second transmission reception point side according to the first embodiment of the present disclosure, which may be implemented by, for example, the electronic device 400 on the first transmission reception point side described with reference to FIG. 4.

As shown in FIG. 12, in the wireless communication method in the electronic device as the second transmission reception point, in step S1201, in the remaining period of a channel occupancy time obtained by a user equipment successfully accessing an unlicensed frequency band, an additional transmission request related to the user equipment is received from another electronic device, wherein the additional transmission request is sent by said another electronic device after the first uplink data transmission from the user equipment is completed in the channel occupancy time. Next, in step S1202, in response to the additional transmission request, an acknowledgement message is sent to the user equipment. Next, in step S1203, within the remaining period, the second uplink data transmission performed by the user equipment based on the acknowledgement message is received.

As an example, the electronic device and said another electronic device may simultaneously provide services for the user equipment in the same cell. Preferably, in step S1201, the additional transmission request from said another electronic device may be received through an optical fiber backhaul.

Preferably, the additional transmission request received in step S1201 may include information related to the expiration time of the channel occupancy time.

Optionally, the wireless communication method may further include: performing channel detection in response to the additional transmission request, and sending the acknowledgment information based on a result of the channel detection.

In one example, the channel detection is simple channel detection. In another example, the channel detection is complex channel detection, and the wireless communication method may further include: sending downlink data to the user equipment together with the acknowledgement message.

According to an embodiment of the present disclosure, the subject performing the above method may be the electronic device 400 according to the first embodiment of the present disclosure, so various aspects of the foregoing embodiment about the electronic device 400 and its functional units are applicable to this method.

[4.2 Method Embodiments of the Second Embodiment (Downlink Scenario)]

Figure 13:
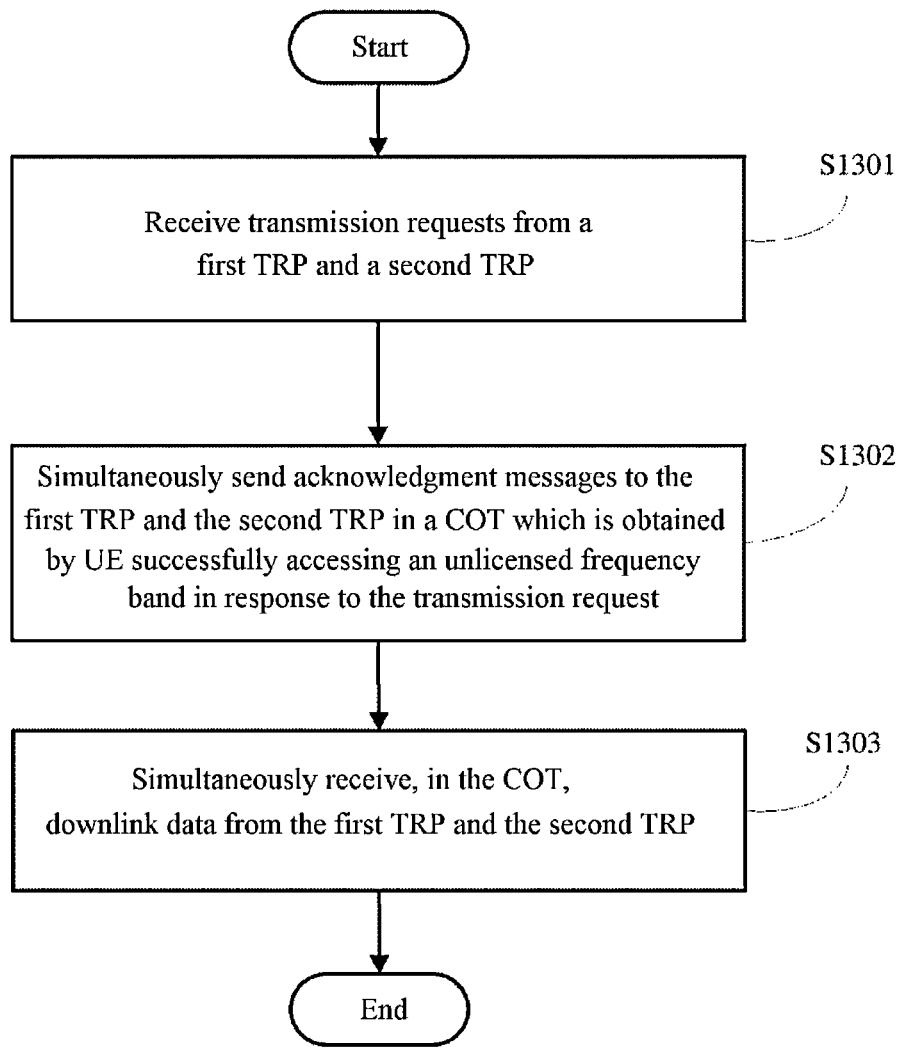
FIG. 13 is a flowchart illustrating a process example of a wireless communication method on the user equipment side according to the second embodiment of the present disclosure.

FIG. 13 is a flowchart illustrating a process example of a wireless communication method on the user equipment side according to the second embodiment of the present disclosure, which can be implemented by, for example, the electronic device 600 on the user equipment side described with reference to FIG. 6.

As shown in FIG. 13, in a wireless communication method such as that of an electronic device as user equipment, in step S1301, transmission requests from a first transmission reception point and a second transmission reception point are received. Next, in step S1302, within the channel occupancy time obtained by successfully accessing the unlicensed frequency band in response to the transmission request, an acknowledgement message is sent simultaneously to the first transmission reception point and the second transmission reception point. Next, in step S1303, the downlink data from the first transmission reception point and the second transmission reception point are simultaneously received within the channel occupancy time.

As an example, the first transmission reception point and the second transmission reception point may provide coordinated multi-point transmission joint transmission for the user equipment.

Optionally, the wireless communication method may further include: performing channel detection in response to the transmission request, and accessing the unlicensed frequency band based on a result of the channel detection.

Preferably, the acknowledgement message sent in step S1302 may include information related to the expiration time of the channel occupancy time.

Optionally, the wireless communication method may further include: simultaneously sending uplink data to the first transmission reception point and the second transmission reception point together with the acknowledgement message.

According to an embodiment of the present disclosure, the subject performing the above method may be the electronic device 600 according to the second embodiment of the present disclosure, so various aspects of the foregoing embodiment about the electronic device 600 and its functional units are applicable to this method.

Figure 14:
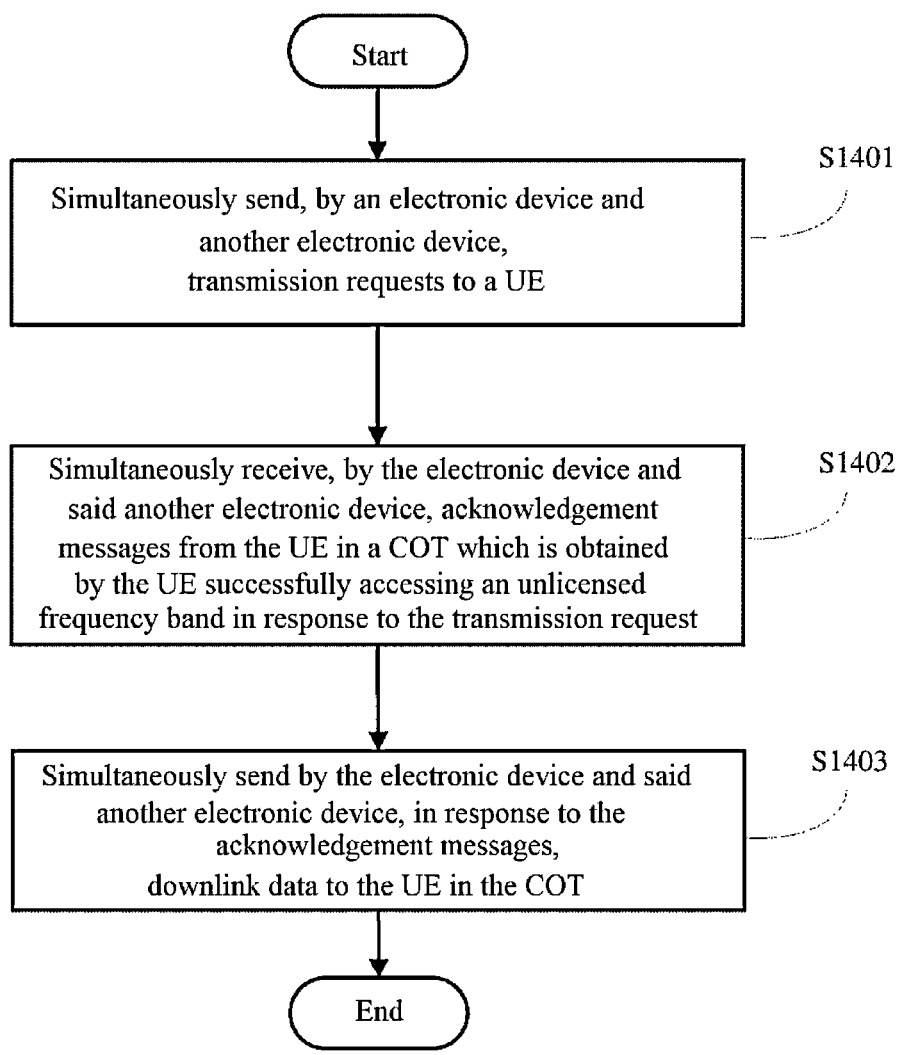
FIG. 14 is a flowchart showing a process example of a wireless communication method on the transmission reception point side according to the second embodiment of the present disclosure.

FIG. 14 is a flowchart illustrating a process example of the wireless communication method on the transmission reception point side according to the second embodiment of the present disclosure, which can be implemented by, for example, the electronic device 800 on the first transmission reception point side described with reference to FIG. 8.

As shown in FIG. 14, in the wireless communication method in the electronic device as the first transmission reception point, for example, in step S1401, a transmission request is sent to the user equipment. Next, in step S1402, in the channel occupancy time which is obtained by the user equipment successfully accessing an unlicensed frequency band in response to the transmission request, an acknowledgement message is received from the user equipment. Next, in step S1403, in the channel occupancy time, downlink data is sent to the user equipment in response to the acknowledgement message. Here, the electronic device performs processing of sending a transmission request, receiving an acknowledgment message, and sending downlink data simultaneously with, for example, another electronic device serving as a second transmission reception point.

As an example, the electronic device and said another electronic device may provide coordinated multi-point transmission-joint transmission for the user equipment.

Optionally, the wireless communication method may further include: (the electronic device and said another electronic device) performing first channel detection and sending the transmission request based on a result of the first channel detection. In this case, for example, only when the results of the first channel detection of the electronic device and the first channel detection of said another electronic device both indicate that there is an idle channel, the transmission request can be sent to the user equipment in step S1401.

Preferably, the acknowledgement message received in step S1402 may include information related to the expiration time of the channel occupancy time.

Optionally, the wireless communication method may further include: (the electronic device and said another electronic device) receiving uplink data sent from the user equipment together with the acknowledgement message.

Optionally, the wireless communication method may further include: (the electronic device and said another electronic device) performing second channel detection in response to the acknowledgement message, and sending downlink data to the user equipment based on the result of the second channel detection. In this case, for example, the downlink data may be sent to the user equipment in step S1403 only when the results of the second channel detection of the electronic device and the second channel detection of said another electronic device both indicate that there is an idle channel.

According to an embodiment of the present disclosure, the subject performing the above method may be the electronic device 800 according to the second embodiment of the present disclosure, so various aspects of the foregoing embodiment of the electronic device 800 and its functional units are applicable to this method.

5. APPLICATION EXAMPLES

The techniques of this disclosure can be applied to various products.

For example, the electronic device 100 or 600 on the user equipment side may be various user equipments, which may be implemented as a mobile terminal (such as a smart phone, a tablet personal computer (PC), a notebook PC, a portable game terminal, a portable/dongle mobile router, and a digital camera device), or an in-vehicle terminal (such as a car navigation apparatus). The user equipment may be implemented as a terminal for machine-to-machine (M2M) communication (which is also referred to as a machine type communication (MTC) terminal). In addition, the user equipment may be a wireless communication module (such as an integrated circuit module including a single wafer) mounted on each of the above terminal devices.

In addition, the electronic device 300, 400 or 500 on the transmission reception point side may be implemented as any type of TRP. The TRP may have functions of transmitting and receiving, for example, the TRP may receive information from the user equipment and the base station device, and may also transmit information to the user equipment and the base station device. In a typical example, the TRP may serve the user equipment and be controlled by the base station device. Further, the TRP may have a structure similar to that of the base station device, or may only have the structure related to transmitting and receiving information in the base station device.

[Application Examples of Base Stations that can be used as Transmission Reception Points]

First Application Example

Figure 15:
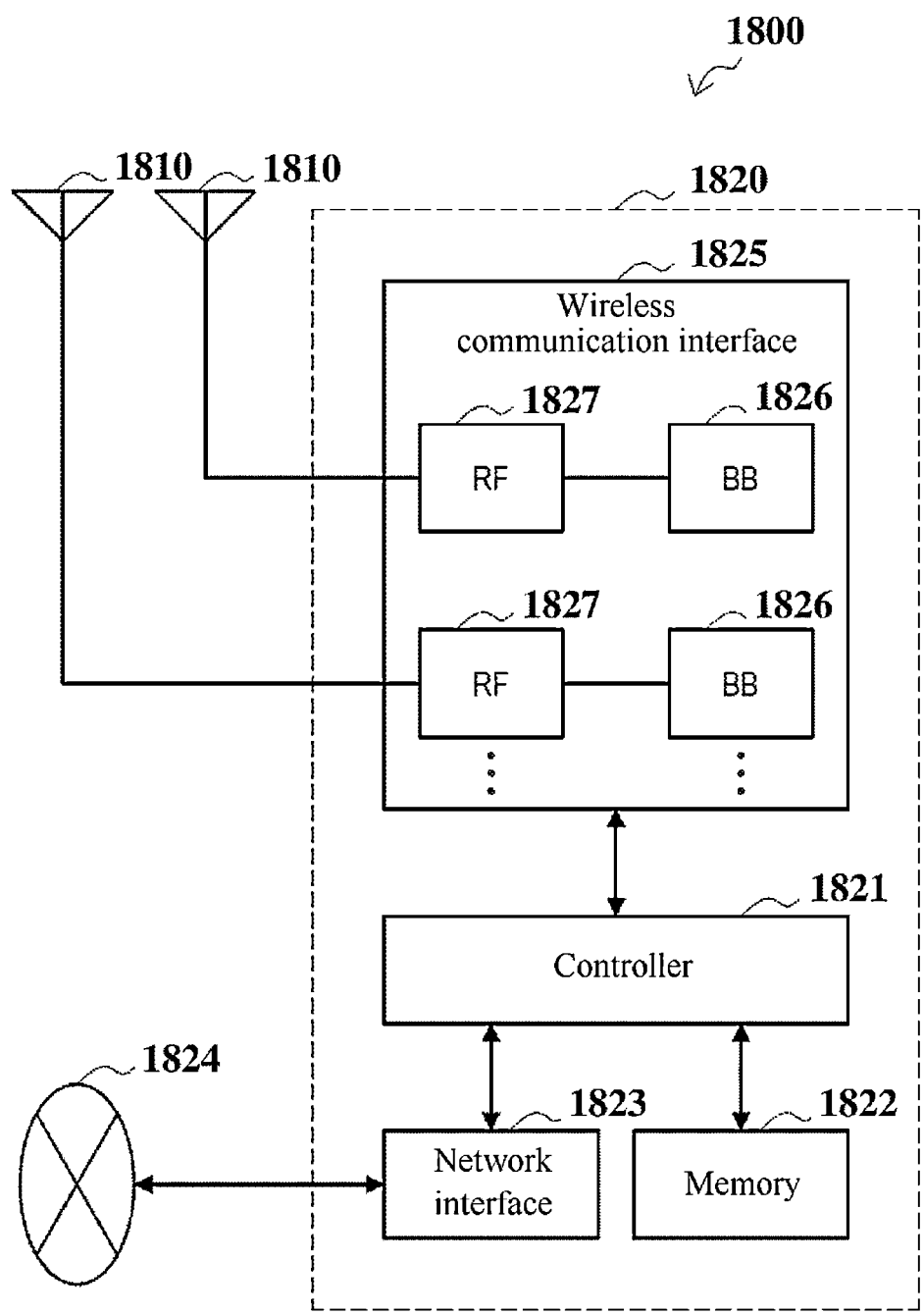
FIG. 15 is a block diagram illustrating a first example of a schematic configuration of an eNB that can be used as a transmission reception point to which the techniques of this disclosure may be applied.

FIG. 15 is a block diagram showing a first example of a schematic configuration of an eNB to which the technology according to the present disclosure may be applied. An eNB 1800 includes one or more antennas 1810 and a base station device 1820. The base station device 1820 and each of the antennas 1810 may be connected to each other via a radio frequency (RF) cable.

Each of the antennas 1810 includes a single or multiple antennal elements (such as multiple antenna elements included in a multiple-input multiple-output (MIMO) antenna), and is used for the base station device 1820 to transmit and receive wireless signals. As shown in FIG. 15, the eNB 1800 may include the multiple antennas 1810. For example, the multiple antennas 1810 may be compatible with multiple frequency bands used by the eNB 1800.

Although FIG. 15 shows the example in which the eNB 1800 includes the multiple antennas 1810, the eNB 1800 may include a single antenna 1810.

The base station device 1820 includes a controller 1821, a memory 1822, a network interface 1823, and a wireless communication interface 1825.

The controller 1821 may be, for example, a CPU or a DSP, and operates various functions of a higher layer of the base station device 1820. For example, the controller 1821 generates a data packet from data in signals processed by the wireless communication interface 1825, and transfers the generated packet via the network interface 1823. The controller 1821 may bundle data from multiple base band processors to generate bundled packet, and transfer the generated bundled packet. The controller 1821 may have logical functions of performing control such as wireless resource control, wireless bearer control, mobility management, admission control and scheduling. The control may be performed in corporation with an eNB or a core network node in the vicinity. The memory 1822 includes a RAM and a ROM, and stores a program executed by the controller 1821 and various types of control data (such as a terminal list, transmission power data and scheduling data).

The network interface 1823 is a communication interface for connecting the base station device 1820 to a core network 1824. The controller 1821 may communicate with a core network node or another eNB via the network interface 1823. In this case, the eNB 1800, and the core network node or another eNB may be connected to each other via a logic interface (such as an S1 interface and an X2 interface). The network interface 1823 may also be a wired communication interface or a wireless communication interface for wireless backhaul. If the network interface 1823 is a wireless communication interface, the network interface 1823 may use a higher frequency band for wireless communication than that used by the wireless communication interface 1825.

The wireless communication interface 1825 supports any cellular communication scheme (such as Long Term Evolution (LTE) and LTE-advanced), and provides wireless connection to a terminal located in a cell of the eNB 1800 via the antenna 1810. The wireless communication interface 1825 may typically include, for example, a baseband (BB) processor 826 and an RF circuit 1827. The BB processor 1826 may perform, for example, encoding/decoding, modulating/demodulating, and multiplexing/demultiplexing, and perform various types of signal processing of layers (such as L1, Media Access Control (MAC), Radio Link Control (RLC), and a Packet Data Convergence Protocol (PDCP)). The BB processor 1826 may have a part or all of the above-described logical functions instead of the controller 821. The BB processor 1826 may be a memory storing communication control programs, or a module including a processor and a related circuit configured to execute the programs. Updating the program may allow the functions of the BB processor 1826 to be changed. The module may be a card or a blade inserted into a slot of the base station device 1820. Alternatively, the module may be a chip mounted on the card or the blade. Meanwhile, the RF circuit 1827 may include, for example, a mixer, a filter, and an amplifier, and transmits and receives wireless signals via the antenna 1810.

As shown in FIG. 15, the wireless communication interface 1825 may include multiple BB processors 1826. For example, the multiple BB processors 1826 may be compatible with multiple frequency bands used by the eNB 1800. The wireless communication interface 1825 may include multiple RF circuits 1827, as shown in FIG. 15. For example, the multiple RF circuits 1827 may be compatible with multiple antenna elements. Although FIG. 15 shows the example in which the wireless communication interface 1825 includes multiple BB processors 1826 and multiple RF circuits 1827, the wireless communication interface 1825 may include a single BB processor 1826 and a single RF circuit 1827.

In the eNB 1800 shown in FIG. 15, the sending units 310, 410, and 810 and the receiving units 320, 420, and 820 in the electronic devices 300, 400, and 800 previously described with reference to FIGS. 3, 4, and 8 can be implemented by the wireless communication interface 1825 under the control of the controller 1821. At least a part of the functions of the optional channel detecting units 330, 430, and 830 in the electronic devices 300, 400, and 800 may be implemented by the controller 1821 controlling the relevant units of the eNB 1800 to perform related processing, which will not be repeated here.

Second Application Example

Figure 16:
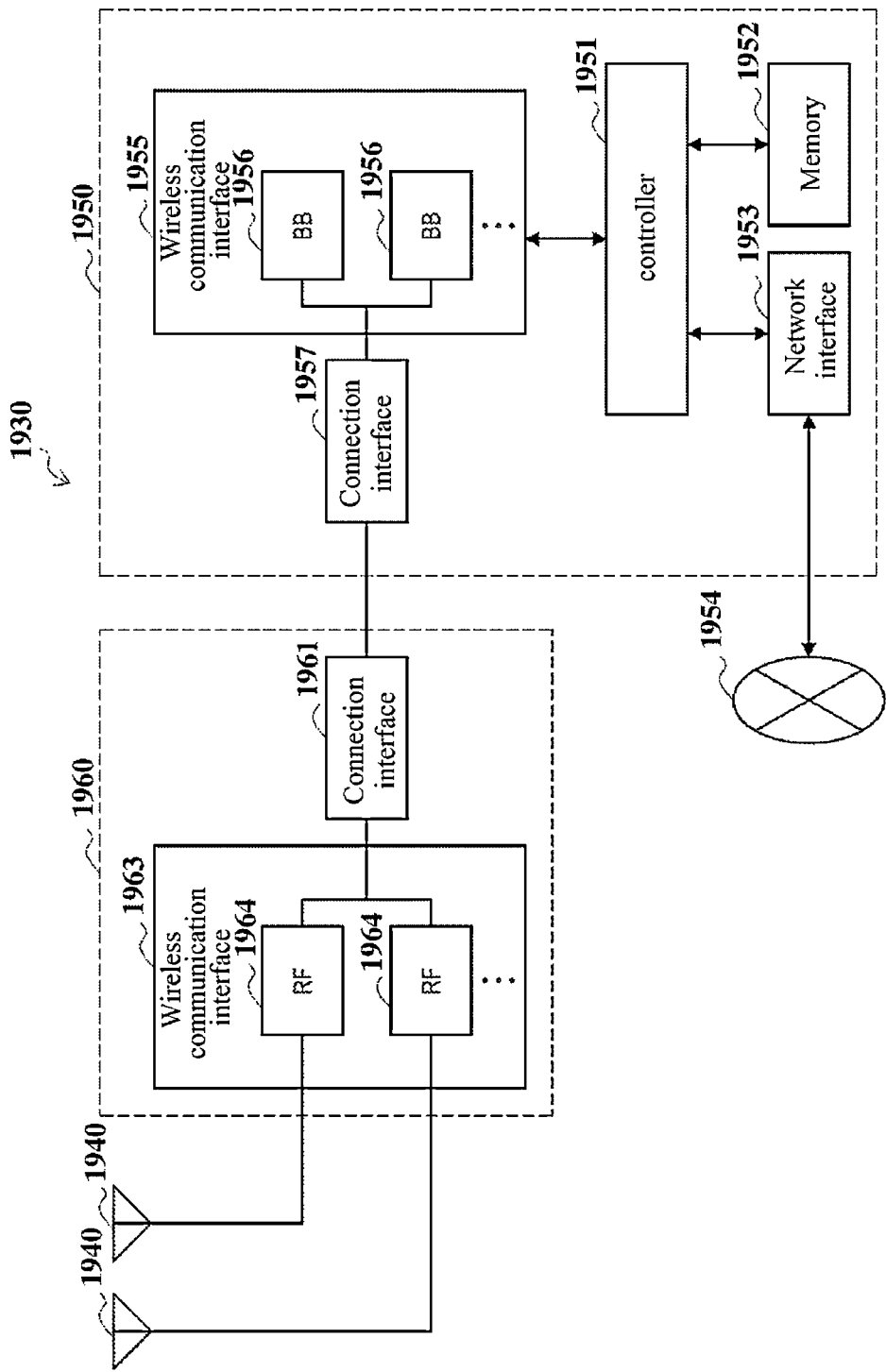
FIG. 16 is a block diagram illustrating a second example of a schematic configuration of an eNB that can be used as a transmission reception point to which the techniques of this disclosure may be applied.

FIG. 16 is a block diagram showing a second example of a schematic configuration of an eNB to which the technology according to the present disclosure may be applied. An eNB 1930 includes one or more antennas 1940, a base station device 1950, and an RRH 1960. The RRH 1960 and each of the antennas 1940 may be connected to each other via an RF cable. The base station device 1950 and the RRH 1960 may be connected to each other via a high speed line such as an optical fiber cable.

Each of the antennas 1940 includes a single or multiple antennal elements (such as multiple antenna elements included in an MIMO antenna), and is used for the RRH 1960 to transmit and receive wireless signals. As shown in FIG. 16, the eNB 1930 may include multiple antennas 1940. For example, the multiple antennas 1940 may be compatible with multiple frequency bands used by the eNB 1930. Although FIG. 16 shows the example in which the eNB 1930 includes multiple antennas 1940, the eNB 1930 may include a single antenna 1940.

The base station device 1950 includes a controller 1951, a memory 1952, a network interface 1953, a wireless communication interface 1955, and a connection interface 1957. The controller 1951, the memory 1952, and the network interface 1953 are the same as the controller 1821, the memory 1822, and the network interface 1823 described with reference to FIG. 15.

The wireless communication interface 1955 supports any cellular communication scheme (such as LTE and LTE-advanced), and provides wireless communication to a terminal located in a sector corresponding to the RRH 1960 via the RRH 1960 and the antenna 1940. The wireless communication interface 1955 may typically include, for example, a BB processor 1956. The BB processor 1956 is the same as the BB processor 1826 described with reference to FIG. 16, except that the BB processor 1956 is connected to an RF circuit 1964 of the RRH 1960 via the connection interface 1957. As show in FIG. 16, the wireless communication interface 1955 may include multiple BB processors 1956. For example, the multiple BB processors 1956 may be compatible with multiple frequency bands used by the eNB 1930. Although FIG. 16 shows the example in which the wireless communication interface 1955 includes multiple BB processors 1956, the wireless communication interface 1955 may include a single BB processor 1956.

The connection interface 1957 is an interface for connecting the base station device 1950 (wireless communication interface 1955) to the RRH 1960. The connection interface 1957 may also be a communication module for communication in the above-described high speed line that connects the base station device 850 (wireless communication interface 1955) to the RRH 1960.

The RRH 1960 includes a connection interface 1961 and a wireless communication interface 1963.

The connection interface 1961 is an interface for connecting the RRH 1960 (wireless communication interface 1963) to the base station device 1950. The connection interface 1961 may also be a communication module for communication in the above-described high speed line.

The wireless communication interface 1963 transmits and receives wireless signals via the antenna 1940. The wireless communication interface 1963 may typically include, for example, an RF circuit 1964. The RF circuit 1964 may include, for example, a mixer, a filter and an amplifier, and transmits and receives wireless signals via the antenna 1940. The wireless communication interface 1963 may include multiple RF circuits 1964, as shown in FIG. 16. For example, the multiple RF circuits 1964 may support multiple antenna elements. Although FIG. 16 shows the example in which the wireless communication interface 1963 includes multiple RF circuits 1964, the wireless communication interface 1963 may include a single RF circuit 1964.

In the eNB 1930 shown in FIG. 16, the sending units 310, 410, and 810 and the receiving units 320, 420, and 820 in the electronic devices 300, 400, and 800 previously described with reference to FIGS. 3, 4, and 8 can be implemented by the wireless communication interface 1963 under the control of the controller 1951. At least a part of the functions of the optional channel detecting units 330, 430, and 830 in the electronic devices 300, 400, and 800 may be implemented by the controller 1951 controlling the relevant units of the eNB 1930 to perform related processing, which will not be repeated here.

[Application Examples of User Equipment]

First Application Example

Figure 17:
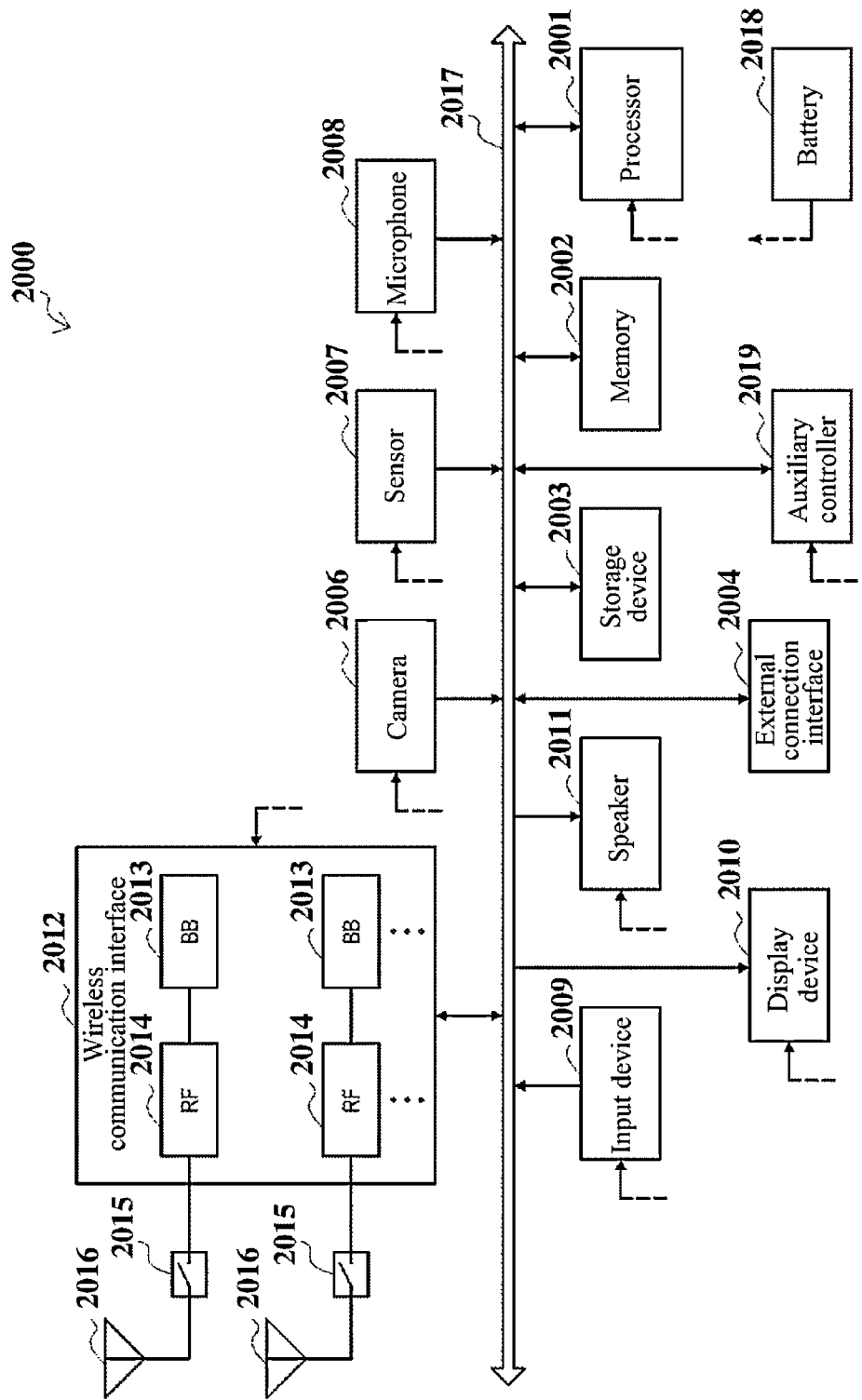
FIG. 17 is a block diagram showing an example of a schematic configuration of a smartphone to which the techniques of the present disclosure may be applied.

FIG. 17 is a block diagram showing an example of a schematic configuration of a smartphone 2000 to which the technology of the present disclosure may be applied. The smartphone 2000 includes a processor 2001, a memory 2002, a storage device 2003, an external connection interface 2004, a camera device 2006, a sensor 2007, a microphone 2008, an input device 2009, a display device 2010, a speaker 2011, a wireless communication interface 2012, one or more antenna switches 2015, one or more antennas 2016, a bus 2017, a battery 2018, and an auxiliary controller 2019.

The processor 2001 may be, for example, a CPU or a system on a chip (SoC), and controls the functions of the application layer and other layers of the smartphone 2000. The memory 2002 includes a RAM and a ROM, and stores data and programs executed by the processor 2001. The storage device 2003 may include a storage medium such as a semiconductor memory and a hard disk. The external connection interface 2004 is an interface for connecting an external device, such as a memory card or a universal serial bus (USB) device, to the smartphone 2000.

The camera device 2006 includes an image sensor (such as a charge coupled device (CCD) and a complementary metal oxide semiconductor (CMOS)), and generates a captured image. The sensor 2007 may include a group of sensors, such as a measurement sensor, a gyroscope sensor, a geomagnetic sensor, and an acceleration sensor. The microphone 2008 converts sound inputted to the smartphone 2000 into an audio signal. The input device 2009 includes, for example, a touch sensor, a keypad, a keyboard, a button, or a switch configured to detect a touch on a screen of the display device 2010, and receives an operation or information inputted from a user. The display device 2010 includes a screen, such as a liquid crystal display (LCD) or an organic light emitting diode (OLED) display, and displays an output image of the smartphone 2000. The speaker 2011 converts the audio signal outputted from the smartphone 2000 into sound.

The wireless communication interface 2012 supports any cellular communication scheme (such as LTE and LTE-Advanced), and performs wireless communication. The wireless communication interface 2012 may generally include, for example, a BB processor 2013 and an RF circuit 2014. The BB processor 2013 may perform, for example, encoding/decoding, modulation/demodulation, and multiplexing/demultiplexing, and perform various types of signal processing for wireless communication. Further, the RF circuit 2014 may include, for example, a mixer, a filter, and an amplifier, and transmit and receive wireless signals via the antenna 2016. The wireless communication interface 2012 may be a chip module on which a BB processor 2013 and an RF circuit 2014 are integrated. As shown in FIG. 17, the wireless communication interface 2012 may include multiple BB processors 2013 and multiple RF circuits 2014. Although FIG. 17 shows an example in which the wireless communication interface 2012 includes multiple BB processors 2013 and multiple RF circuits 2014, the wireless communication interface 2012 may include a single BB processor 2013 or a single RF circuit 2014.

In addition to the cellular communication scheme, the wireless communication interface 2012 may support another type of wireless communication scheme, such as a short-range wireless communication scheme, a near field communication scheme, and a wireless local area network (LAN) scheme. In this case, the wireless communication interface 2012 may include a BB processor 2013 and an RF circuit 2014 for each wireless communication scheme.

Each of the antenna switches 2015 switches a connection destination of the antenna 2016 among multiple circuits (for example, circuits for different wireless communication schemes) included in the wireless communication interface 2012.

Each of the antennas 2016 includes a single or multiple antenna elements (such as multiple antenna elements included in a MIMO antenna), and is used for the wireless communication interface 2012 to transmit and receive wireless signals. As shown in FIG. 17, the smartphone 2000 may include multiple antennas 2016. Although FIG. 17 shows an example in which the smartphone 2000 includes multiple antennas 2016, the smartphone 2000 may include a single antenna 2016.

In addition, the smartphone 2000 may include antenna(s) 2016 for each wireless communication scheme. In this case, the antenna switches 2015 may be omitted from the configuration of the smart phone 2000.

The processor 2001, the memory 2002, the storage device 2003, the external connection interface 2004, the camera device 2006, the sensor 2007, the microphone 2008, the input device 2009, the display device 2010, the speaker 2011, the wireless communication interface 2012, and the auxiliary controller 2019 are connected to each other via the bus 2017. The battery 2018 supplies power to each block of the smartphone 2000 shown in FIG. 17 via a feeder line. The feeder line is partially shown as a dashed line in FIG. 17. The auxiliary controller 2019 operates the minimum necessary functions of the smartphone 2000 in a sleep mode, for example.

In the smart phone 2000 shown in FIG. 17, the sending units 110 and 610 and the receiving units 120 and 620 in the electronic devices 100 and 600 previously described with reference to FIGS. 2 and 6 can be implemented by the wireless communication interface 2012 under the control of the processor 2001 or the auxiliary controller 2019. At least a part of the functions of the optional channel detecting units 130 and 630 in the electronic devices 100 and 600 may be implemented by the processor 2001 or the auxiliary controller 2019 controlling the relevant units of the smart phone 2000 to perform related processing, which will not be repeated here.

Second Application Example

Figure 18:
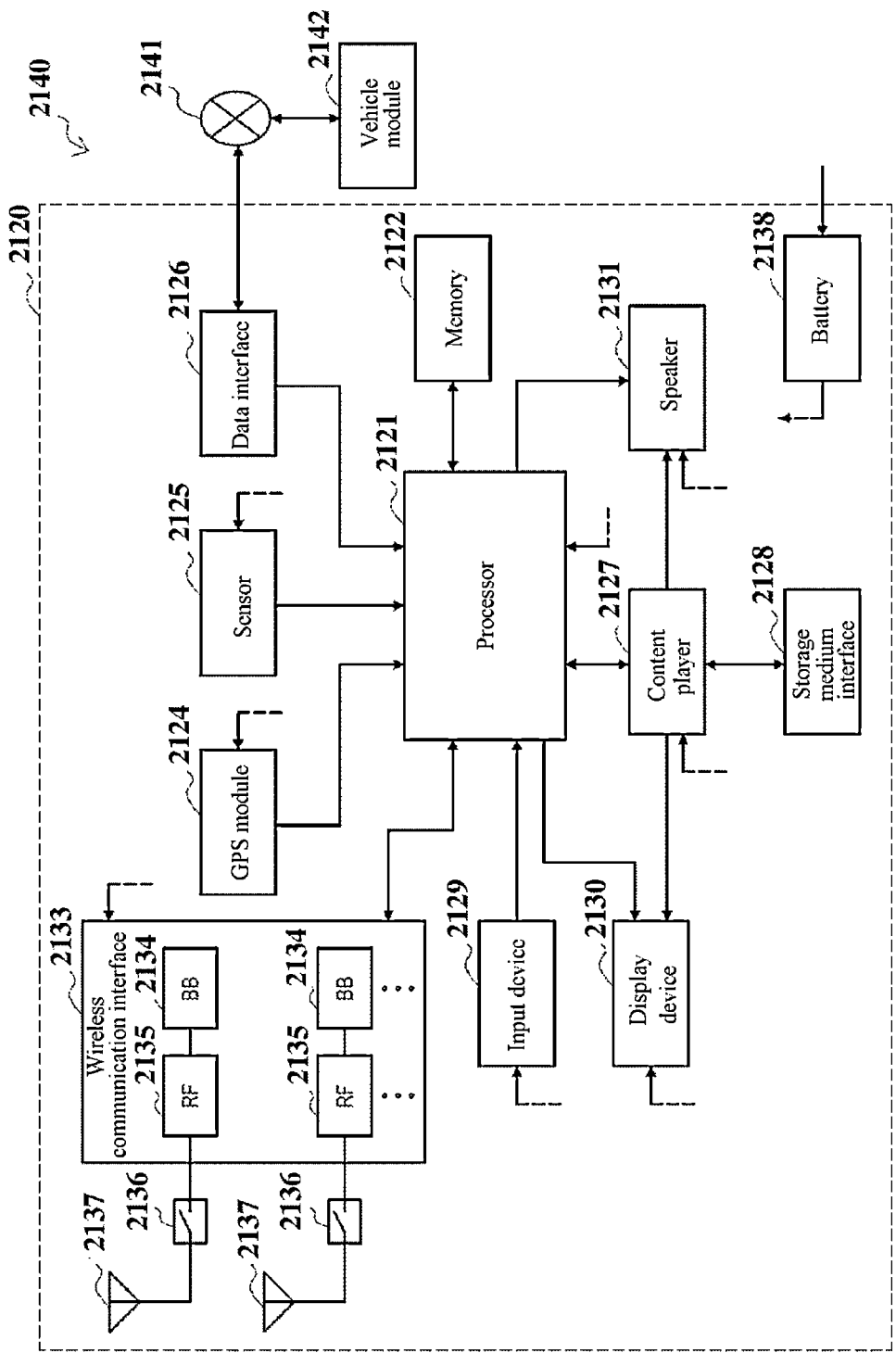
FIG. 18 is a block diagram showing an example of a schematic configuration of a car navigation apparatus to which the technology of the present disclosure can be applied.

FIG. 18 is a block diagram showing an example of a schematic configuration of a vehicle navigation device 2120 to which the technology of the present disclosure may be applied. The vehicle navigation device 2120 includes a processor 2121, a memory 2122, a global positioning system (GPS) module 2124, a sensor 2125, a data interface 2126, a content player 2127, a storage medium interface 2128, an input device 2129, a display device 2130, a speaker 2131, a wireless communication interface 2133, one or more antenna switches 2136, one or more antennas 2137, and a battery 2138.

The processor 2121 may be, for example, a CPU or SoC, and controls the navigation function of the vehicle navigation device 2120 and other functions. The memory 2122 includes a RAM and a ROM, and stores data and programs executed by the processor 2121.

The GPS module 2124 measures a position (such as latitude, longitude, and altitude) of the vehicle navigation device 2120 based on GPS signals received from GPS satellites. The sensor 2125 may include a group of sensors, such as a gyroscope sensor, a geomagnetic sensor, and an air pressure sensor. The data interface 2126 is connected to, for example, a vehicle-mounted network 2141 via a terminal not shown, and acquires data (such as vehicle speed data) generated by the vehicle.

The content player 2127 reproduces content stored in a storage medium (such as CD and DVD) inserted into the storage medium interface 2128. The input device 2129 includes, for example, a touch sensor configured to detect a touch on a screen of the display device 2130, a button, or a switch, and receives an operation or information inputted from the user. The display device 2130 includes a screen such as an LCD or OLED display, and displays an image of a navigation function or reproduced content. The speaker 2131 outputs a sound of the navigation function or the reproduced content.

The wireless communication interface 2133 supports any cellular communication scheme, such as LTE and LTE-Advanced, and performs wireless communication. The wireless communication interface 2133 may generally include, for example, a BB processor 2134 and an RF circuit 2135. The BB processor 2134 may perform, for example, encoding/decoding, modulation/demodulation, and multiplexing/demultiplexing, and perform various types of signal processing for wireless communication. Further, the RF circuit 2135 may include, for example, a mixer, a filter, and an amplifier, and transmit and receive wireless signals via the antenna 2137. The wireless communication interface 2133 may also be a chip module on which the BB processor 2134 and the RF circuit 2135 are integrated. As shown in FIG. 18, the wireless communication interface 2133 may include multiple BB processors 2134 and multiple RF circuits 2135. Although FIG. 18 shows an example in which the wireless communication interface 2133 includes multiple BB processors 2134 and multiple RF circuits 2135, the wireless communication interface 2133 may include a single BB processor 2134 or a single RF circuit 2135.

In addition to the cellular communication scheme, the wireless communication interface 2133 may support another type of wireless communication scheme, such as a short-range wireless communication scheme, a near field communication scheme, or a wireless LAN scheme. In this case, the wireless communication interface 2133 may include a BB processor 2134 and an RF circuit 2135 for each wireless communication scheme.

Each of the antenna switches 2136 switches a connection destination of the antenna 2137 among multiple circuits, such as circuits for different wireless communication schemes, included in the wireless communication interface 2133.

Each of the antennas 2137 includes a single or multiple antenna elements (such as multiple antenna elements included in a MIMO antenna), and is used for the wireless communication interface 2133 to transmit and receive wireless signals. As shown in FIG. 18, the vehicle navigation device 2120 may include multiple antennas 2137. Although FIG. 18 shows an example in which the vehicle navigation device 2120 includes multiple antennas 2137, the vehicle navigation device 2120 may include a single antenna 2137.

In addition, the vehicle navigation device 2120 may include antenna(s) 2137 for each wireless communication scheme. In this case, the antenna switches 2136 may be omitted from the configuration of the vehicle navigation device 2120.

The battery 2138 supplies power to each block of the vehicle navigation device 2120 shown in FIG. 18 via a feeder line. The feeder line is partially shown as a dashed line in FIG. 18. The battery 2138 accumulates electric power supplied from the vehicle.

In the vehicle navigation device 2120 shown in FIG. 18, the sending units 110 and 610 and the receiving units 120 and 620 in the electronic devices 100 and 600 previously described with reference to FIGS. 2 and 6 can be implemented by the wireless communication interface 2133 under the control of the processor 2121. The optional channel detecting units 130 and 630 in the electronic devices 100 and 600 may be implemented by the processor 2121 controlling related units of the vehicle navigation device 2120 to perform related processing, which will not be repeated here.

The technology of the present disclosure may also be implemented as a vehicle-mounted system (or vehicle) 2140 including one or more blocks in the vehicle navigation device 2120, a vehicle-mounted network 2141, and a vehicle module 2142. The vehicle module 2142 generates vehicle data (such as vehicle speed, engine speed, and failure information), and outputs the generated data to the vehicle-mounted network 2141.

The preferred embodiments of the present disclosure are described above with reference to the drawings, but the present disclosure is not limited to the above examples. Those skilled in the art may make various alternations and modifications within the scope of the claims, and it should be understood that these alternations and modifications shall naturally fall within the technical scope of the present disclosure.

For example, a unit shown by a dashed box in the functional block diagram shown in the drawings indicates that the functional unit is optional in a corresponding device, and optional functional units may be combined with each other in an appropriate manner to achieve a desired function.

For example, multiple functions included in one unit in the above embodiments may be implemented by separate devices. Alternatively, multiple functions implemented by multiple units in the above embodiments may be implemented by separate devices, respectively. In addition, one of the above functions may be implemented by multiple units. Such configuration shall also be included in the technical scope of the present disclosure.

In this specification, the steps described in the flowchart include not only processes performed in time series as the order described, but also processes performed in parallel or individually instead of having to be performed in time series. Further, even in the steps processed in time series, the order may be appropriately changed.

The basic principles of the present disclosure have been described above in conjunction with specific embodiments, but it should be noted that those skilled in the art can understand that all or any steps or components of the methods and devices of the present disclosure can be implemented, in any computing device (including a processor, a storage medium, etc.) or any network of computing devices, in the form of hardware, firmware, software or a combination thereof, which can be achieved by those skilled in the art through the basic circuit design knowledge or basic programming skills after reading the description of the present disclosure.

Furthermore, the present disclosure also proposes a program product storing machine-readable instruction codes. When the instruction codes are read and executed by a machine, the above-mentioned method according to the embodiment of the present disclosure can be executed.

Correspondingly, a storage medium for carrying a program product storing the above-mentioned machine-readable instruction codes is also included in the disclosure of the present disclosure. The storage medium includes, but is not limited to, a floppy disk, an optical disk, a magneto-optical disk, a memory card, a memory stick, and the like.

When the present disclosure is implemented by software or firmware, a program constituting the software is installed from a storage medium or a network to a computer having a dedicated hardware configuration that can execute various functions and the like when various programs are installed.

The preferred embodiments of the present disclosure are described above with reference to the drawings, but the present disclosure is not limited to the above examples. Those skilled in the art may make various alternations and modifications within the scope of the claims, and it should be understood that these alternations and modifications shall naturally fall within the technical scope of the present disclosure.

For example, a unit shown by a dashed box in the functional block diagram shown in the drawings indicates that the functional unit is optional in a corresponding device, and optional functional units may be combined with each other in an appropriate manner to achieve a desired function.

For example, multiple functions included in one unit in the above embodiments may be implemented by separate devices. Alternatively, multiple functions implemented by multiple units in the above embodiments may be implemented by separate devices, respectively. In addition, one of the above functions may be implemented by multiple units. Such configuration shall also be included in the technical scope of the present disclosure.

In this specification, the steps described in the flowchart include not only processes performed in time series as the order described, but also processes performed in parallel or individually instead of having to be performed in time series. Further, even in the steps processed in time series, the order may be appropriately changed.

Furthermore, the present disclosure may have configurations as described below.

(1) An electronic device, comprising:
processing circuitry configured to:
perform first uplink data transmission to a first transmission reception point in a channel occupancy time obtained by the electronic device successfully accessing an unlicensed frequency band, and
perform, in a remaining period after the first uplink data transmission is completed in the channel occupancy time, second uplink data transmission to a second transmission reception point in the vicinity of the first transmission reception point based on an acknowledgement message from the second transmission reception point,
wherein the acknowledgement message is sent by the second transmission reception point to the electronic device in response to an additional transmission request, the additional transmission request being sent by the first transmission reception point to the second transmission reception point when the first uplink data transmission is completed.

(2) The electronic device of (1), wherein the processing circuitry is further configured to:
send a first transmission request to the first transmission reception point in the channel occupancy time, wherein the first transmission request includes information related to expiration time of the channel occupancy time.

(3) The electronic device of (2), wherein the processing circuitry is further configured to:
send uplink data to the first transmission reception point together with the first transmission request.

(4) The electronic device of (2), wherein the processing circuitry is further configured to:
perform the first uplink data transmission in response to an acknowledgement message from the first transmission reception point, wherein the acknowledgement message is sent by the first transmission reception point to the electronic device based on first channel detection performed in response to the first transmission request.

(5) The electronic device of (4), wherein the first channel detection is complex channel detection, and the processing circuitry is further configured to: receive downlink data sent from the first transmission reception point together with the acknowledgement message.

(6) The electronic device of (1), wherein the acknowledgement message from the second transmission reception point is sent by the second transmission reception point to the electronic device based on second channel detection performed in response to the additional transmission request.

(7) The electronic device of (6), wherein the second channel detection is complex channel detection, and the processing circuitry is further configured to: receive downlink data sent by the second transmission reception point together with the acknowledgement message.

(8) The electronic device of (1), wherein the first transmission reception point and the second transmission reception point simultaneously provide services for the electronic device in a cell.

(9) The electronic device of (1), wherein the processing circuitry is further configured to:
perform, in a remaining period after the second uplink data transmission is completed in the channel occupancy time, third uplink data transmission to a third transmission reception point in the vicinity of the second transmission reception point based on an acknowledgement message from the third transmission reception point,
wherein the acknowledgement message is sent by the third transmission reception point to the electronic device in response to an additional transmission request, the additional transmission request being sent by the second transmission reception point to the third transmission reception point when the second uplink data transmission is completed.

(10) An electronic device, comprising:
processing circuitry configured to:
receive first uplink data transmission from user equipment in a channel occupancy time obtained by the user equipment successfully accessing an unlicensed frequency band, and
send, in a remaining period after the first uplink data transmission is completed in the channel occupancy time, an additional transmission request related to second uplink data transmission of the user equipment to another electronic device in the vicinity of the electronic device.

(11) The electronic device of (10), wherein the processing circuitry is further configured to:
receive a first transmission request from the user equipment in the channel occupancy time, wherein the first transmission request includes information related to expiration time of the channel occupancy time.

(12) The electronic device of (11), wherein the processing circuitry is further configured to:
receive uplink data sent from the user equipment together with the first transmission request.

(13) The electronic device of (11), wherein the processing circuitry is further configured to:
perform channel detection in response to the first transmission request, and send an acknowledgement message to the user equipment based on a result of the channel detection.

(14) The electronic device of (13), wherein the channel detection is simple channel detection.

(15) The electronic device of (14), wherein the channel detection is complex channel detection, and the processing circuitry is further configured to: send downlink data to the user equipment together with the acknowledgement message.

(16) The electronic device of (11), wherein the additional transmission request includes information related to expiration time of the channel occupancy time.

(17) The electronic device of (10), wherein the electronic device and said another electronic device simultaneously provide services for the user equipment in a cell.

(18) The electronic device of (17), wherein the processing circuitry is further configured to: send the additional transmission request to said another electronic device over a fiber backhaul.

(19) An electronic device, comprising:
processing circuitry configured to:
receive, in a remaining period of a channel occupancy time obtained by a user equipment successfully accessing an unlicensed frequency band, an additional transmission request related to the user equipment from another electronic device, wherein the additional transmission request is sent by said another electronic device after first uplink data transmission from the user equipment is completed in the channel occupancy time;
send an acknowledgement message to the user equipment in response to the additional transmission request; and
receive, in the remaining period, second uplink data transmission performed by the user equipment based on the acknowledgement message.

(20) The electronic device of (19), wherein the additional transmission request includes information related to expiration time of the channel occupancy time.

(21) The electronic device of (19), wherein the processing circuitry is further configured to:
perform channel detection in response to the additional transmission request, and send the acknowledgment information based on a result of the channel detection.

(22) The electronic device of (21), wherein the channel detection is simple channel detection.

(23) The electronic device of (21), wherein the channel detection is complex channel detection, and the processing circuitry is further configured to: send downlink data to the user equipment together with the acknowledgement message.

(24) The electronic device of (19), wherein the electronic device and said another electronic device simultaneously provide services for the user equipment in a cell.

(25) The electronic device of (24), wherein the processing circuitry is further configured to:
receive the additional transmission request from said another electronic device over a fiber backhaul.

(26) An electronic device, comprising:
processing circuitry configured to:
receive transmission requests from a first transmission reception point and a second transmission reception point;
send an acknowledgment message simultaneously to the first transmission reception point and the second transmission reception point in a channel occupancy time which is obtained by successfully accessing an unlicensed frequency band in response to the transmission request; and
receive simultaneously, in the channel occupancy time, downlink data from the first transmission reception point and the second transmission reception point.

(27) The electronic device of (26), wherein the processing circuitry is further configured to:
perform channel detection in response to the transmission request, and access the unlicensed frequency band based on a result of the channel detection.

(28) The electronic device of (26), wherein the acknowledgement message includes information related to expiration time of the channel occupancy time.

(29) The electronic device of (26), wherein the processing circuitry is further configured to:
send uplink data simultaneously to the first transmission reception point and the second transmission reception point together with the acknowledgement message.

(30) The electronic device of (26), wherein the first transmission reception point and the second transmission reception point provide coordinated multi-point transmission-joint transmission for the user equipment.

(31) An electronic device comprising:
processing circuitry configured to:
send a transmission request to a user equipment;
receive an acknowledgement message from the user equipment in a channel occupancy time which is obtained by the user equipment successfully accessing an unlicensed frequency band in response to the transmission request; and
send, in response to the acknowledgement message, downlink data to the user equipment in the channel occupancy time,
wherein respective processing circuitries of the electronic device and another electronic device are configured to simultaneously perform processing of sending a transmission request, receiving an acknowledgment message, and sending downlink data.

(32) The electronic device of (31), wherein the processing circuitry is further configured to:
perform first channel detection, and send the transmission request based on a result of the first channel detection.

(33) The electronic device of (32), wherein the processing circuitry is further configured to:
send the transmission request to the user equipment only when results of the first channel detection of the electronic device and the first channel detection of said another electronic device both indicate that there is an idle channel.

(34) The electronic device of (31), wherein the acknowledgement message includes information related to expiration time of the channel occupancy time.

(35) The electronic device of (31), wherein the processing circuitry is further configured to receive uplink data sent from the user equipment together with the acknowledgement message.

(36) The electronic device of (31), wherein the processing circuitry is further configured to:
perform second channel detection in response to the acknowledgement message, and send downlink data to the user equipment based on a result of the second channel detection.

(37) The electronic device of (36), wherein the processing circuitry is further configured to:
send the downlink data to the user equipment only when results of the second channel detection of the electronic device and the second channel detection of said another electronic devices both indicate that there is an idle channel.

(38) The electronic device of (31), wherein the electronic device and said another electronic device provide coordinated multi-point transmission-joint transmission for the user equipment.

(39) A wireless communication method in an electronic device, the method comprising:
performing first uplink data transmission to a first transmission reception point in a channel occupancy time obtained by the electronic device successfully accesses an unlicensed frequency band; and
performing, in a remaining period after the first uplink data transmission is completed in the channel occupancy time, second uplink data transmission to a second transmission reception point in the vicinity of the first transmission reception point based on an acknowledgement message from the second transmission reception point,
wherein the acknowledgement message is sent by the second transmission reception point to the electronic device in response to an additional transmission request, the additional transmission request being sent by the first transmission reception point to the second transmission reception point when the first uplink data transmission is completed.

(40) A wireless communication method in an electronic device, the method comprising:
receiving first uplink data transmission from a user equipment in a channel occupancy time obtained by the user equipment successfully accessing an unlicensed frequency band; and
sending, in a remaining period after the first uplink data transmission is completed in the channel occupancy time, an additional transmission request related to second uplink data transmission of the user equipment to another electronic device in the vicinity of the electronic device.

(41) A wireless communication method in an electronic device, the method comprising:
receiving, in a remaining period of a channel occupancy time obtained by a user equipment successfully accessing an unlicensed frequency band, an additional transmission request related to the user equipment from another electronic device, wherein the additional transmission request is sent by said another electronic device when first uplink data transmission from the user equipment is completed in the channel occupancy time;
sending an acknowledgement message to the user equipment in response to the additional transmission request; and
receiving, in the remaining period, second uplink data transmission performed by the user equipment based on the acknowledgment message.

(42) A wireless communication method in an electronic device, the method comprising:
receiving transmission requests from a first transmission reception point and a second transmission reception point;
sending an acknowledgment message simultaneously to the first transmission reception point and the second transmission reception point in a channel occupancy time which is obtained by successfully accessing an unlicensed frequency band in response to the transmission request; and
receiving simultaneously, in the channel occupancy time, downlink data from the first transmission reception point and the second transmission reception point.

(43) A wireless communication method in an electronic device, the method comprising:
sending a transmission request to a user equipment;
receiving an acknowledgement message from the user equipment in a channel occupancy time which is obtained by the user equipment successfully accessing an unlicensed frequency band in response to the transmission request; and
sending, in response to the acknowledgement message, downlink data to the user equipment in the channel occupancy time,
wherein the electronic device and another electronic device simultaneously perform processing of sending a transmission request, receiving an acknowledgment message, and sending downlink data.

(44) A non-transitory computer readable storage medium storing a program which, when executed by a processor, causes the processor to perform the method of any one of (39) to (43).

Although the embodiments of the present disclosure have been described in detail above with reference to the accompanying drawings, it should be understood that the above-described embodiments are only used to illustrate the present disclosure, but not to limit the present disclosure. Various modifications and variations of the above-described embodiments may be made by those skilled in the art without departing from the spirit and scope of the present disclosure. Accordingly, the scope of the present disclosure is to be limited only by the appended claims and their equivalents.

The invention claimed is:

1. An electronic device, comprising:
processing circuitry configured to:
perform first uplink data transmission to a first transmission reception point in a channel occupancy time obtained by the electronic device successfully accessing an unlicensed frequency band, and
perform, in a remaining period after the first uplink data transmission is completed in the channel occupancy time, second uplink data transmission to a second transmission reception point in the vicinity of the first transmission reception point based on an acknowledgement message from the second transmission reception point,
wherein the acknowledgement message is sent by the second transmission reception point to the electronic device in response to an additional transmission request, the additional transmission request being sent by the first transmission reception point to the second transmission reception point when the first uplink data transmission is completed.

2. The electronic device of claim 1, wherein the processing circuitry is further configured to:
send a first transmission request to the first transmission reception point in the channel occupancy time, wherein the first transmission request includes information related to expiration time of the channel occupancy time.

3. The electronic device of claim 2, wherein the processing circuitry is further configured to:
send uplink data to the first transmission reception point together with the first transmission request.

4. The electronic device of claim 2, wherein the processing circuitry is further configured to:
perform the first uplink data transmission in response to an acknowledgement message from the first transmission reception point, wherein the acknowledgement message is sent by the first transmission reception point to the electronic device based on first channel detection performed in response to the first transmission request.

5. The electronic device of claim 4, wherein the first channel detection is complex channel detection, and the processing circuitry is further configured to: receive downlink data sent from the first transmission reception point together with the acknowledgement message.

6. The electronic device of claim 1, wherein the acknowledgement message from the second transmission reception point is sent by the second transmission reception point to the electronic device based on second channel detection performed in response to the additional transmission request.

7. The electronic device of claim 6, wherein the second channel detection is complex channel detection, and the processing circuitry is further configured to: receive downlink data sent by the second transmission reception point together with the acknowledgement message.

8. The electronic device of claim 1, wherein the processing circuitry is further configured to:
perform, in a remaining period after the second uplink data transmission is completed in the channel occupancy time, third uplink data transmission to a third transmission reception point in the vicinity of the second transmission reception point based on an acknowledgement message from the third transmission reception point,
wherein the acknowledgement message is sent by the third transmission reception point to the electronic device in response to an additional transmission request, the additional transmission request being sent by the second transmission reception point to the third transmission reception point when the second uplink data transmission is completed.

9. An electronic device, comprising:
processing circuitry configured to:
receive transmission requests from a first transmission reception point and a second transmission reception point;
send an acknowledgment message simultaneously to the first transmission reception point and the second transmission reception point in a channel occupancy time which is obtained by successfully accessing an unlicensed frequency band in response to the transmission request; and
receive simultaneously, in the channel occupancy time, downlink data from the first transmission reception point and the second transmission reception point.

10. The electronic device of claim 9, wherein the processing circuitry is further configured to:
perform channel detection in response to the transmission request, and access the unlicensed frequency band based on a result of the channel detection, and/or
send uplink data simultaneously to the first transmission reception point and the second transmission reception point together with the acknowledgement message.

11. The electronic device of claim 9, wherein the acknowledgement message includes information related to expiration time of the channel occupancy time.

* * * * *